US011346950B2

(12) United States Patent  (10) Patent No.: US 11,346,950 B2
Amirloo Abolfathi et al.  (45) Date of Patent: May 31, 2022

(54) SYSTEM, DEVICE AND METHOD OF GENERATING A HIGH RESOLUTION AND HIGH ACCURACY POINT CLOUD

(71) Applicants: Elmira Amirloo Abolfathi, North York (CA); Keyvan Golestan Irani, Newmarket (CA)

(72) Inventors: Elmira Amirloo Abolfathi, North York (CA); Keyvan Golestan Irani, Newmarket (CA)

(73) Assignee: Huawei Technologies Co., Ltd., Shenzhen (CN)

(*) Notice: Subject to any disclaimer, the term of this patent is extended or adjusted under 35 U.S.C. 154(b) by 720 days.

(21) Appl. No.: 16/195,365

(22) Filed: Nov. 19, 2018

(65) Prior Publication Data

US 2020/0158869 A1  May 21, 2020

(51) Int. Cl.
  *G01S 17/86*  (2020.01)
  *G01S 7/497*  (2006.01)
  *G01S 17/42*  (2006.01)
  *G01S 17/87*  (2020.01)
  *G06N 20/00*  (2019.01)

(52) U.S. Cl.
  CPC .............. *G01S 17/86* (2020.01); *G01S 7/497* (2013.01); *G01S 17/42* (2013.01); *G01S 17/87* (2013.01); *G06N 20/00* (2019.01)

(58) Field of Classification Search
  None
  See application file for complete search history.

(56) References Cited

U.S. PATENT DOCUMENTS 7,417,717 B2 * 8/2008 Pack ................. G01S 17/08
                                                    356/4.01
2017/0200273 A1  7/2017  Kamilov et al.
2018/0066934 A1  3/2018  Nakazato et al.
(Continued)

FOREIGN PATENT DOCUMENTS

CN      108694731 A    10/2018
WO    2014152254 A2     9/2014
(Continued)

OTHER PUBLICATIONS

LiDAR and Camera Detection Fusion in a Real-Time Industrial Multi-Sensor Collision Avoidance System, Pan Wei (Year: 2018).*

*Primary Examiner* — Yuqing Xiao
*Assistant Examiner* — Amir J Askarian

(57) ABSTRACT

A system, device and method of generating high resolution and high accuracy point cloud. In one aspect, a computer vision system receives a camera point cloud from a camera system and a LiDAR point cloud from a LiDAR system. An error of the camera point cloud is determined using the LiDAR point cloud as a reference. A correction function is determined based on the determined error. A corrected point cloud is generated from the camera point cloud using the correction function. A training error of the corrected point cloud is determined using the first LiDAR point cloud as a reference. The correction function is updated based on the determined training error. When training is completed, the correction function can be used by the computer vision system to generate a generating high resolution and high accuracy point cloud from the camera point cloud provided by the camera system.

23 Claims, 11 Drawing Sheets

(56) References Cited

U.S. PATENT DOCUMENTS

| | | | | |
|---|---|---|---|---|
| 2019/0004533 A1* | 1/2019 | Huang | ................ | G06K 9/4628 |
| 2019/0096135 A1* | 3/2019 | Dal Mutto | ................ | G06T 7/50 |
| 2019/0266792 A1 | 8/2019 | Yao et al. | | |
| 2020/0249359 A1* | 8/2020 | Tisdale | ............. | G06K 9/00791 |

FOREIGN PATENT DOCUMENTS

| | | | |
|---|---|---|---|
| WO | 2017122529 A1 | 7/2017 | |
| WO | 2018090250 A1 | 5/2018 | |
| WO | 2018115963 A2 | 6/2018 | |

* cited by examiner

SYSTEM, DEVICE AND METHOD OF GENERATING A HIGH RESOLUTION AND HIGH ACCURACY POINT CLOUD

TECHNICAL FIELD

The present disclosure relates to computer vision, and in particular, to a system, device and method of generating a high resolution and high accuracy point cloud.

BACKGROUND

LiDAR (Light Detection and Ranging) point clouds may be used in point cloud map generation. Point cloud map generation involves moving a scanning LiDAR around an environment (i.e., driving a LiDAR-equipped car in a neighborhood), collecting all the point clouds generated by the LiDAR, and combining the generated point clouds together to generate point cloud map. The generated point cloud map includes a larger set of 3D data points than a conventional point cloud and has extended boundaries. Point cloud maps may be utilized for map-based vehicle localization in vehicle driver assistance systems or autonomous vehicles during autonomous driving.

Computer vision systems rely on reliable and accurate sensor data and implement machine learning algorithms that are capable of understanding the sensor data. Computer vision systems are an important component of vehicle driver assistance systems and autonomous vehicles, among a number of applications. Many machine learning algorithms exist to generate a two-dimensional (2D) or three-dimensional (3D) representation of the environment, including one or more of an object detection algorithm, dynamic object removal algorithm, simultaneous localization and mapping (SLAM) algorithm, a point cloud map generation algorithm, a high definition map creation algorithm, a LiDAR-based localization algorithm, a semantic mapping algorithm, tracking algorithm or scene reconstruction algorithm. These machine learning algorithms require accurate sensor data to provide a reliable and efficient result. One of the most common data types to represent a 3D environment is a point cloud. Computer vision systems can generate a point cloud map as part of spatial cognition. A point cloud is a large set of data points in a coordinate system, typically a 3D coordinate system. Each data point in the point cloud has three (3) coordinates, namely x, y, and z coordinates, which determine where the data point is located along x, y, and z axes of the 3D coordinate system, respectively. LiDAR sensors or stereo cameras can be used to sense an environment and generate a point cloud of the environment from sensor data captured by the LiDAR sensors or the stereo cameras. The point cloud generated by each of these individual sensors has some drawbacks.

Generating point clouds using LiDARs is very accurate but has two main problems. First, high resolution LiDARs are often very expensive relative to stereo cameras. Second, less expensive LiDARs, such as those with 8-beams, 16-beams and 32-beams, suffer from sparsity (low resolution). On the other hand, stereo cameras are cheaper than LiDARs but the sensor data captured by the stereo cameras (e.g. image data representative of images captured by the stereo camera) is high resolution. However, a limitation of stereo cameras is that the point cloud generated from the sensor data captured by a stereo camera (e.g. image data representative of images captured by a stereo camera) suffers from low accuracy. That is, the spatial coordinate of the data points in the resultant point cloud is not accurate. Thus, the low resolution of a point cloud generated by a LiDAR with a low number of beams or the low accuracy of a point cloud generated from image data representative of images captured by a stereo camera adversely affect any machine learning algorithm that uses these point clouds to generate an understanding of the environment.

Significant research has been conducted on overcoming the low accuracy and low resolution limitations of point clouds. A group of algorithms focus on improving the resolution of a low resolution LiDAR point cloud. Another group of algorithms use high resolution LiDARs data and other sensor data, such as images captured by stereo cameras, to generate a very dense point cloud. The latter group of algorithms take advantage of a point cloud generated from sensor data collected by a high resolution/high accuracy LiDAR and a point cloud generated from sensor data collected by a high resolution stereo camera by fusing the data together. This is a technically challenging task and requires both sensors to be available, which in many cases is not possible due to the high price of high resolution LiDARs.

Another technique for generating a high resolution/high accuracy point cloud is to fuse a low resolution point cloud generated by a low resolution LiDAR (low number of beams) together with sensor data received from other sensors. In machine learning based methods, the fusion of other sensory data is embedded in the solution as the sensors used in training procedure are the same as sensors used in testing mode. For machine learning algorithms, classical fusion methods are adopted for generating point clouds. The latter group of algorithms requires both sensors to be available.

In view of the foregoing, there remains a need for a low cost and effective solution for generating a high resolution and high accuracy point cloud.

SUMMARY

The present disclosure provides a system, device and method of generating a high resolution and high accuracy point cloud from sensor data from at least two sensors of different types, such as low resolution LiDARs and stereo cameras, without using expensive sensors such as high resolution LiDARs which are not feasible for commercial purposes due to the high cost of such systems. Therefore, it is an objective of the present disclosure to provide an effective and/or efficient solution for generating high resolution and high accuracy point clouds using a combination of relatively inexpensive sensors. The resultant high resolution and high accuracy point cloud may be used by one or more point cloud application algorithms that utilize point clouds, particularly those that require high resolution and/or high accuracy point clouds to function effectively. Examples of point cloud application algorithms with which the high resolution and high accuracy point cloud may be used include one or more of an object detection algorithm, dynamic object removal algorithm, simultaneous localization and mapping (SLAM) algorithm, a point cloud map generation algorithm, a high definition map creation algorithm, a LiDAR-based localization algorithm, a semantic mapping algorithm, tracking algorithm or scene reconstruction algorithm, typically in 3D but possibly 2D. The output of the point cloud application algorithm(s) may be used to generate a 3D representation of an environment. When the host device is a vehicle, the 3D representation of the environment may be displayed on a display within the console or dashboard of the vehicle.

In accordance with a first aspect of the present disclosure, there is provided a computer vision system. In accordance with one embodiment of the first aspect of the present disclosure, the computer vision system comprises a processor system, a first LiDAR system having a first resolution coupled to the processor system, a camera system coupled to the processor system, and a memory coupled to the processor system, the memory tangibly storing thereon executable instructions that, when executed by the processor system, cause the computer vision system to perform a number of operations. A camera point cloud is received from the camera system. A first LiDAR point cloud is received from the first LiDAR system. An error of the camera point cloud is determined using the first LiDAR point cloud as a reference. A correction function is determined based on the determined error. A corrected point cloud is generated from the camera point cloud using the correction function. A training error of the corrected point cloud is determined using the first LiDAR point cloud as a reference. The correction function is updated based on the determined training error.

According to some embodiments of the previous aspect and embodiments, the executable instructions, when executed by the processor system, cause the computer vision system to repeat some of the operations until the training error is less than an error threshold.

According to some embodiments of the previous aspect and embodiments, the executable instructions to determine an error of the camera point cloud using the first LiDAR point cloud as a reference and to determine a correction function based on the determined error, when executed by the processor system, cause the computer vision system to generate a mathematical representation (e.g., model) of the error of the camera point cloud using the first LiDAR point cloud as a reference, and determine a correction function based on the mathematical representation of the error. According to some embodiments of the previous aspect and embodiments, the executable instructions to determine a training error of the corrected point cloud using the first LiDAR point cloud as a reference and to update the correction function based on the determined training error, when executed by the processor system, cause the computer vision system to generate a mathematical representation of the training error of the corrected point cloud using the first LiDAR point cloud as a reference, and update the correction function based on the mathematical representation of the training error.

According to some embodiments of the previous aspect and embodiments, the computer vision system further comprises a second LiDAR system having a second resolution coupled to the processor system, wherein the second resolution of the second LiDAR system is higher than the first resolution of the first LiDAR system, and the executable instructions, when executed by the processor system, cause the computer vision system to (a) receive a second LiDAR point cloud from the second LiDAR system, (b) determine an error of the corrected point cloud using the second LiDAR point cloud as a reference, (c) determine a correction function based on the determined error, (d) generate a corrected point cloud using the correction function, (e) determine a secondary training error of the corrected point cloud using the second LiDAR point cloud as a reference, (f) update the correction function based on the determined secondary training error.

According to some embodiments of the previous aspect and embodiments, the executable instructions, when executed by the processor system, cause the computer vision system to repeat operations (d)-(f) until the secondary training error is less than an error threshold.

According to some embodiments of the previous aspect and embodiments, the second LiDAR system comprises one or more 64-beam LiDAR units and the first LiDAR system comprises one or more 8-beam, 16-beam or 32-beam LiDAR units.

According to some embodiments of the previous aspect and embodiments, the camera system is a stereo camera system and the camera point cloud is a stereo camera point cloud.

According to some embodiments of the previous aspect and embodiments, the processor system comprises a neural network.

In accordance with another embodiment of the first aspect of the present disclosure, there is provided a computer vision system comprising a processor system, a first LiDAR system having a first resolution coupled to the processor system, a camera system coupled to the processor system, and a memory coupled to the processor system, the memory tangibly storing thereon executable instructions that, when executed by the processor system, cause the computer vision system to perform a number of operations. A camera point cloud is received from the camera system. A first LiDAR point cloud is received from the first LiDAR system. An error of the camera point cloud is determined using the first LiDAR point cloud as a reference. A correction function is determined based on the determined error. A corrected point cloud is generated from the camera point cloud using the correction function. An output of a point cloud application algorithm is calculated using corrected point cloud and an output of the point cloud application algorithm is calculated using the first LiDAR point cloud. A cost of error in the output of the point cloud application algorithm is determined via a cost function using corrected point cloud. The correction function is determined based on the determined cost.

According to some embodiments of the previous aspect and embodiments, the executable instructions, when executed by the processor system, cause the computer vision system to repeat some of the operations until the cost is less than a cost threshold.

According to some embodiments of the previous aspect and embodiments, the executable instructions to determine an error of the camera point cloud using the first LiDAR point cloud as a reference and to determine a correction function based on the determined error, when executed by the processor system, cause the computer vision system to generate a mathematical representation (e.g, model) of the error of the camera point cloud using the first LiDAR point cloud as a reference, and determine a correction function based on the mathematical representation of the error.

According to some embodiments of the previous aspect and embodiments, the executable instructions to determine a training error of the corrected point cloud using the first LiDAR point cloud as a reference and to update the correction function based on the determined training error, when executed by the processor system, cause the computer vision system to generate a mathematical representation (e.g., model) of the training error of the corrected point cloud using the first LiDAR point cloud as a reference, and update the correction function based on the mathematical representation of the training error.

According to some embodiments of the previous aspect and embodiments, the computer vision system further comprises a second LiDAR system having a second resolution coupled to the processor system, wherein the second resolution of the second LiDAR system is higher than the first resolution of the first LiDAR system, and the executable instructions, when executed by the processor system, cause the computer vision system to (a) receive a second LiDAR point cloud from the second LiDAR system, (b) determine an error of the corrected point cloud using the second LiDAR point cloud as a reference, (c) determine a correction function based on the determined error, (d) generate a corrected point cloud using the correction function, (e) calculate an output of a point cloud application algorithm using corrected point cloud and an output of the point cloud application algorithm using the second LiDAR point cloud, (f) determine via a cost function a secondary cost of error in the output of the point cloud application algorithm using corrected point cloud, and (g) update the correction function based on the determined secondary cost.

According to some embodiments of the previous aspect and embodiments, the executable instructions, when executed by the processor system, cause the computer vision system to repeat operations (d)-(g) until the secondary cost is less than a cost threshold.

According to some embodiments of the previous aspect and embodiments, the second LiDAR system comprises one or more 64-beam LiDAR units and the first LiDAR system comprises one or more 8-beam, 16-beam or 32-beam LiDAR units.

According to some embodiments of the previous aspect and embodiments, the camera system is a stereo camera system and the camera point cloud is a stereo camera point cloud.

According to some embodiments of the previous aspect and embodiments, the processor system comprises a neural network.

In accordance with a further embodiment of the first aspect of the present disclosure, there is provided a computer vision system comprising a processor system, a camera system coupled to the processor system, and a memory coupled to the processor system, the memory tangibly storing thereon executable instructions that, when executed by the processor system, cause the computer vision system to perform a number of operations. A camera point cloud is generated from the camera system. A pre-trained correction function is applied to generate a corrected point cloud having increased resolution relative to the camera point cloud. An output of a point cloud application algorithm is calculated using corrected point cloud. According to some embodiments of the previous aspect and embodiments, a visual representation of the output of the point cloud application algorithm is output on a display of the computer vision system.

According to some embodiments of the previous aspect and embodiments, the point cloud application algorithm comprises one or more of an object detection algorithm, dynamic object removal algorithm, simultaneous localization and mapping (SLAM) algorithm, a point cloud map generation algorithm, a high definition map creation algorithm, a LiDAR-based localization algorithm, a semantic mapping algorithm, tracking algorithm or scene reconstruction algorithm.

According to some embodiments of the previous aspect and embodiments, the camera system is a stereo camera system and the camera point cloud is a stereo camera point cloud.

According to some embodiments of the previous aspect and embodiments, the processor system comprises a neural network.

In accordance with a second aspect of the present disclosure, there is provided a method of training a pre-processing module to generate a corrected point cloud. In accordance with one embodiment of the second aspect of the present disclosure, the method comprises receiving a camera point cloud from a camera system, receiving a first LiDAR point cloud from a first LiDAR system, determining an error of the camera point cloud using the first LiDAR point cloud as a reference, determining a correction function based on the determined error, generating a corrected point cloud from the camera point cloud using the correction function, determining a training error of the corrected point cloud using the first LiDAR point cloud as a reference, and updating the correction function based on the determined training error.

In accordance with another embodiment of the second aspect of the present disclosure, the method comprises receiving a camera point cloud from a camera system, receiving a first LiDAR point cloud from a first LiDAR system, determining an error of the camera point cloud using the first LiDAR point cloud as a reference, determining a correction function based on the determined error, generating a corrected point cloud from the camera point cloud using the correction function, calculating an output of a point cloud application algorithm using corrected point cloud and an output of the point cloud application algorithm using the first LiDAR point cloud, determining via a cost function a cost of error in the output of the point cloud application algorithm using corrected point cloud, updating the correction function based on the determined cost.

In accordance with one embodiment of a further aspect of the present disclosure, there is provided a method of generating a corrected point cloud. The method comprises generating a point cloud from a sensor system, applying a pre-trained correction function to generate a corrected point cloud having increased resolution relative to the point cloud, calculating an output of a point cloud application algorithm using corrected point cloud. According to some embodiments of the previous aspect and embodiments, the method further comprises outputting on a display a visual representation of the output of the point cloud application algorithm.

In accordance with a further aspect of the present disclosure, there is provided a vehicle control system for a vehicle. The vehicle control system comprises a computer vision system, the computer vision system having the features described above and herein.

In accordance with a further aspect of the present disclosure, there is provided a vehicle comprising a mechanical system for moving the vehicle, a drive control system coupled to the mechanical system for controlling the mechanical system and a vehicle control system coupled to the drive control system, the vehicle control system having the features described above and herein.

In accordance with a yet further aspect of the present disclosure, there is provided a non-transitory machine readable medium having tangibly stored thereon executable instructions for execution by a processor system of a computer vision system having the features described above and herein. The executable instructions, when executed by the processor system, cause the computer vision system to perform the methods described above and herein.

DESCRIPTION OF EXAMPLE EMBODIMENTS

Figure 1:
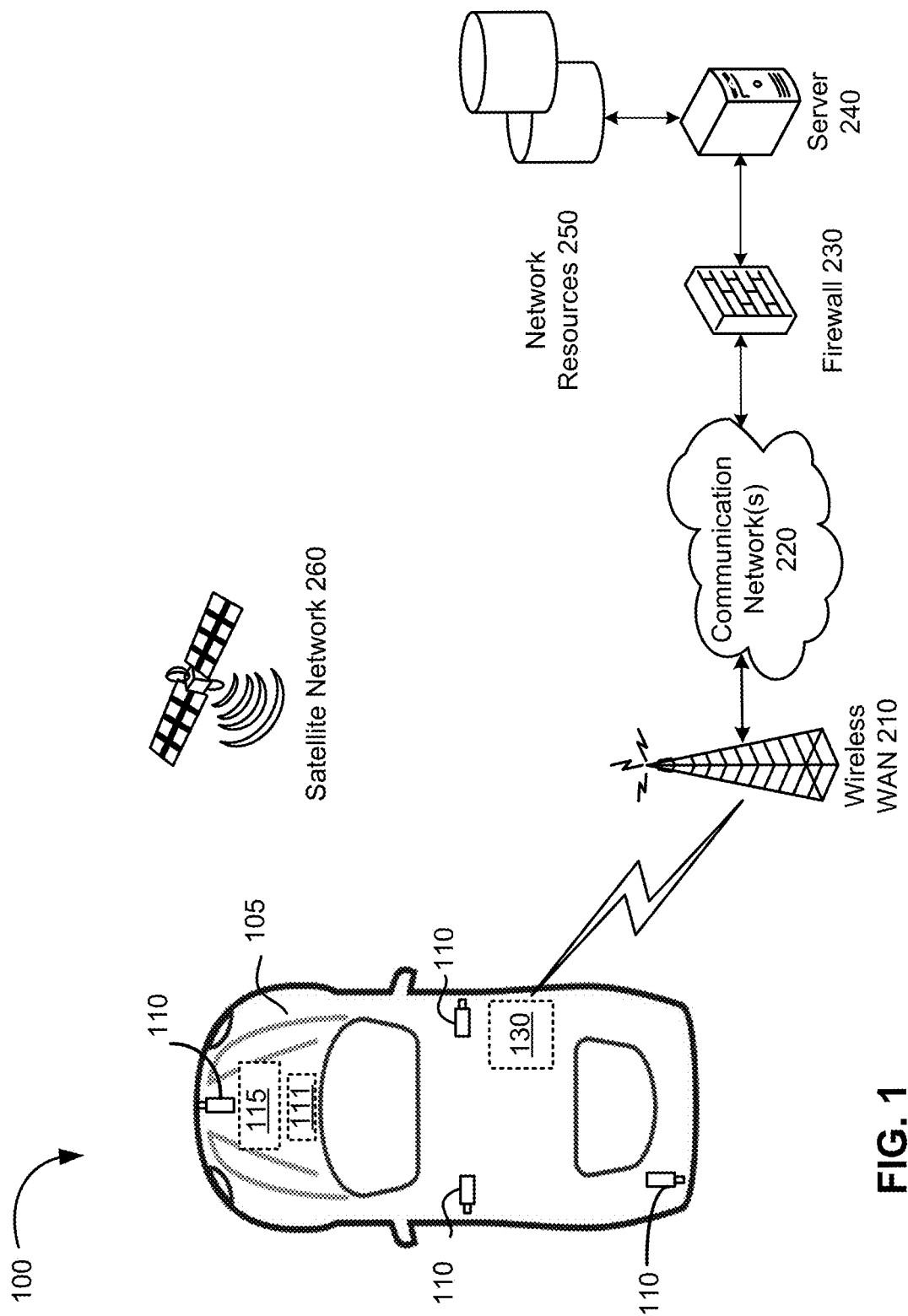
FIG. 1 is a schematic diagram of a communication system suitable for practicing example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

For convenience, the present disclosure describes example embodiments of methods and systems with reference to a motor vehicle, such as a car, truck, bus, boat or ship, submarine, aircraft, warehouse equipment, construction equipment, tractor or other farm equipment. The teachings of the present disclosure are not limited to any particular type of vehicle, and may be applied to vehicles that do not carry passengers as well as vehicles that do carry passengers. The teachings of the present disclosure may also be implemented in mobile robot vehicles including, but not limited to, autonomous vacuum cleaners, rovers, lawn mowers, unmanned aerial vehicle (UAV), and other objects.

Figure 2:
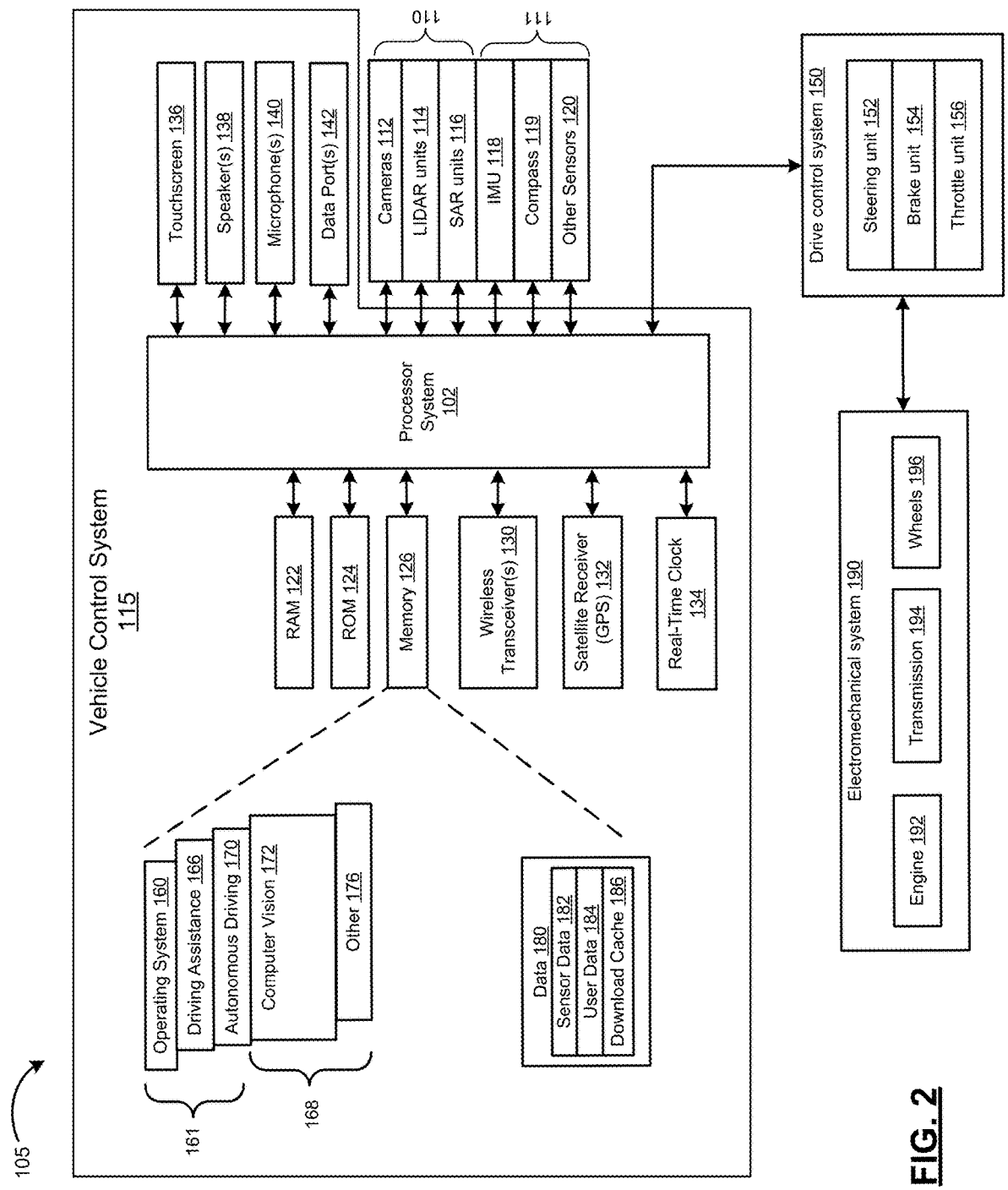
FIG. 2 is a block diagram of a vehicle comprising a vehicle control system in accordance with one example embodiment of the present disclosure.

FIG. 1 is a schematic diagram showing selected components of a communication system 100 in accordance with one example embodiment of the present disclosure. The communication system 100 comprises user equipment in the form of a vehicle control system 115 embedded in a vehicle 105. The vehicle control system 115, shown in greater detail in FIG. 2, is coupled to a drive control system 150 and a mechanical system 190 of the vehicle 105, as described below. The vehicle control system 115 can in various embodiments allow the vehicle 105 to be operable in one or more of a fully-autonomous, semi-autonomous or fully user-controlled mode.

The vehicle 105 includes a plurality of electromagnetic (EM) wave based sensors 110 that collect data about the external environment surrounding the vehicle 105, and a plurality of vehicle sensors 111 that collect data about the operating conditions of the vehicle 105. The EM wave based sensors 110 may, for example, include one or more cameras 112, one or more light detection and ranging (LiDAR) units 114, and one or more radar units such as synthetic aperture radar (SAR) units 116. The digital cameras 112, LiDAR units 114 and SAR units 116 are located about the vehicle 105 and are each coupled to the vehicle control system 115, as described below. In an example embodiment, the cameras 112, LiDAR units 114 and SAR units 116 are located at the front, rear, left side and right side of the vehicle 105 to capture data about the environment in front, rear, left side and right side of the vehicle 105. For each type of EM wave based sensor 110, individual units are mounted or otherwise located to have different fields of view (FOVs) or coverage areas to capture data about the environment surrounding the vehicle 105. In some examples, for each type of EM wave based sensor 110, the FOVs or coverage areas of some or all of the adjacent EM wave based sensors 110 are partially overlapping. Accordingly, the vehicle control system 115 receives data about the external environment of the vehicle 105 as collected by cameras 112, LiDAR units 114 and SAR units 116.

Vehicle sensors 111 can include an inertial measurement unit (IMU) 118 that senses the vehicle's specific force and angular rate using a combination of accelerometers and gyroscopes, an electronic compass 119, and other vehicle sensors 120 such as a speedometer, a tachometer, wheel traction sensor, transmission gear sensor, throttle and brake position sensors, and steering angle sensor. The vehicle sensors 111, when active, repeatedly (e.g., in regular intervals) sense the environment and provide sensor data based on environmental conditions to the vehicle control system 115 in real-time or near real-time. The vehicle control system 115 may collect data about a position and orientation of the vehicle 105 using signals received from a satellite receiver 132 and the IMU 118. The vehicle control system 115 may determine a linear speed, angular speed, acceleration, engine RPMs, transmission gear and tire grip of the vehicle 105, among other factors, using data from one or more of the satellite receivers 132, the IMU 118, and other vehicle sensors 120.

The vehicle control system 115 may also comprise one or more wireless transceivers 130 that enable the vehicle control system 115 to exchange data and optionally voice communications with a wireless wide area network (WAN) 210 of the communication system 100. The vehicle control system 115 may use the wireless WAN 210 to access a server 240, such as a driving assist server, via one or more communications networks 220, such as the Internet. The server 240 may be implemented as one or more server modules in a data center and is typically located behind a firewall 230. The server 240 is connected to network resources 250, such as supplemental data sources that may be used by the vehicle control system 115.

The communication system 100 comprises a satellite network 260 comprising a plurality of satellites in addition to the wireless WAN 210. The vehicle control system 115 comprises the satellite receiver 132 (FIG. 2) that may use signals received by the satellite receiver 132 from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

FIG. 2 illustrates selected components of the vehicle 105 in accordance with an example embodiment of the present disclosure. As noted above, the vehicle 105 comprises a vehicle control system 115 that is connected to a drive control system 150 and a mechanical system 190 as well as to the EM wave based sensors 110 and the vehicle sensors 111. The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processor system 102 that is coupled to a plurality of components via a communication bus (not shown) which provides a communication path between the components and the processor system 102. The processor system 102 is coupled to a drive control system 150, Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with the wireless WAN 210, a satellite receiver 132 for receiving satellite signals from the satellite network 260, a real-time clock 134, and a touchscreen 136. The processor system 102 may include one or more processing units, including for example one or more central processing units (CPUs), one or more graphical processing units (GPUs), one or more tensor processing units (TPUs), and other processing units.

The one or more wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations (one of which is shown in FIG. 1) of the wireless WAN 210 (e.g., cellular network) within its geographic coverage area. The one or more wireless transceiver(s) 130 may send and receive signals over the wireless WAN 210. The one or more wireless transceivers 130 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The real-time clock 134 may comprise a crystal oscillator that provides accurate real-time time data. The time data may be periodically adjusted based on time data received through satellite receiver 132 or based on time data received from network resources 250 executing a network time protocol.

The touchscreen 136 comprises a display such as a color liquid crystal display (LCD), light-emitting diode (LED) display or active-matrix organic light-emitting diode (AMOLED) display, with a touch-sensitive input surface or overlay connected to an electronic controller. Additional input devices (not shown) coupled to the processor system 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The vehicle control system 115 may also include other sensors such as tire pressure sensors (TPSs), door contact switches, light sensors, proximity sensors, etc.

The drive control system 150 serves to control movement of the vehicle 105. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, receives navigation instructions from an autonomous driving system 170 (for autonomous driving mode) or a driving assistance system 166 (for semi-autonomous driving mode) and generates control signals to control one or more of the steering, braking and throttle of the vehicle 105. The drive control system 150 may include additional components to control other aspects of the vehicle 105 including, for example, control of turn signals and brake lights.

The electromechanical system 190 receives control signals from the drive control system 150 to operate the electromechanical components of the vehicle 105. The electromechanical system 190 effects physical operation of the vehicle 105. The electromechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

A graphical user interface (GUI) of the vehicle control system 115 is rendered and displayed on the touchscreen 136 by the processor system 102. A user may interact with the GUI using the touchscreen 136 and optionally other input devices (e.g., buttons, dials) to select a driving mode for the vehicle 105 (e.g., fully autonomous driving mode or semi-autonomous driving mode) and to display relevant data and/or information, such as navigation information, driving information, parking information, media player information, climate control information, etc. The GUI may comprise a series of traversable content-specific menus.

The memory 126 of the vehicle control system 115 has stored thereon a plurality of software systems 161 in addition to the GUI, each software system 161 including instructions that may be executed by the processor system 102. The software systems 161 include an operating system 160, the driving assistance system 166 for semi-autonomous driving, and the autonomous driving system 170 for fully autonomous driving. Both the driving assistance system 166 and the autonomous driving system 170 can include one or more of a navigation planning and control module, a vehicle localization module, parking assistance module, and autonomous parking module. The memory 126 also has stored thereon software modules 168 that can be invoked by either the driving assistance system 166 or the autonomous driving system 170. The software modules 168 include a computer vision module 172. The computer vision module 172 is a software system that comprises a learning-based pre-processing module 330 or 530, a point cloud processing module 340 or 540, and optionally a cost determining module 360 or 560. Other modules 176 include for example a mapping module, a navigation module, a climate control module, a media player module, a telephone module and a messaging module. The computer vision module 172, when executed by the processor system 102, causes the operations of the methods described herein to be performed. The computer vision module 172 interacts with a combination of the EM wave based sensors 110 to provide a computer vision system, such as the computer vision systems 300, 350, 500 or 550 (FIG. 3A, 3B, 5A, 5B) as described in further detail below.

Although the computer vision module 172 is shown as a separate module that can be invoked by the driving assistance system 166 for semi-autonomous driving and/or the autonomous driving system 170, one or more of the software modules 168, including the computer vision module 172, may be combined with one or more of the other modules 176 in some embodiments.

The memory 126 also stores a variety of data 180. The data 180 may comprise sensor data 182 received from the EM wave based sensors 110, user data 184 comprising user preferences, settings and optionally personal media files (e.g., music, videos, directions, etc.), and a download cache 186 comprising data downloaded via the wireless transceivers 130 including, for example, data downloaded from network resources 250. The sensor data 182 may comprise image data from the cameras 112, 3D data from the LiDAR units 114, RADAR data from the SAR units 116, IMU data from the IMU 118, compass data from the electronic compass 119, and other sensor data from other vehicle sensors 120. The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data and/or information. Data received by the vehicle control system 115 may also be stored in the RAM 122. Although specific functions are described for various types of memory, this is merely one example, and a different assignment of functions to types of memory may also be used.

Generation of a High Resolution and High Accuracy Point Cloud

Figure 3A:
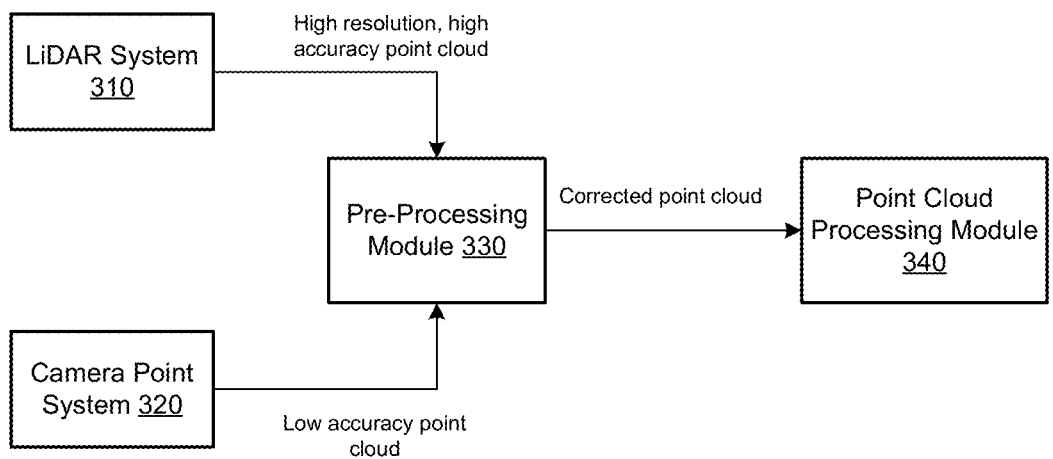
FIGS. 3A and 3B are simplified block diagrams of a computer vision system for training a pre-processing module to generate a corrected point cloud in accordance with example embodiments of the present disclosure.

Reference is next made to FIG. 3A which illustrates a simplified block diagram of a computer vision system 300 for training a pre-processing module to generate a corrected point cloud in accordance with one example embodiment of the present disclosure. The computer vision system 300 may be carried by a test vehicle, such as the vehicle 105, and may operate in either an online mode in which sensor data is being actively received by the EM wave based sensors 110 or an offline mode in which sensor data has been previously received by the EM wave based sensors 110. Alternatively, the computer vision system 300 may be a separate system distinct from the test vehicle that receives and processes sensor data acquired from the test vehicle and operate in an offline mode. The computer vision system 300 receives sensor data from a high resolution, high accuracy sensor system, such as a LiDAR system 310 comprising one or more LiDAR units 114, and sensor data from a low accuracy sensor system, such as a camera system 320 comprising one or more cameras 120.

The computer vision system 300 also comprises the learning-based pre-processing module 330 (hereinafter pre-processing module 330) and a point cloud processing module 340. The computer vision system 300 is intended for training the pre-processing module 330 in a training mode. The training is intended to train the pre-processing module 330 to learn generate a high resolution and high accuracy point cloud in real-time or near real-time using only sensor data received from a low accuracy sensor system (e.g., the camera system 320) or possibly a low resolution system (e.g., one or more LiDAR units 114 comprising a low accuracy LiDAR sensor). The trained pre-processing module 330 may be used in a production vehicle, such as the vehicle 105, comprising a low accuracy sensor system such as a camera system and/or a low resolution sensor system such as a low resolution LiDAR subsystem 510 (FIG. 5A, 5B), described below. For example, the pre-processing module 330 may be provided as a software module installed in the vehicle control system 115 of the production vehicle, either during production and before delivery to a customer or at a suitable time thereafter.

The low accuracy sensor system is typically a high resolution sensor system. The high resolution, high accuracy sensor system provides a reference system which provides ground truth data used for training the pre-processing module 330 to generate the corrected point cloud data from the low accuracy sensor system, as described below.

The sensor data received from the LiDAR system 310 comprises one or more high resolution LiDAR units, such as a LiDAR unit having 64-beams or more, and provides a high resolution LiDAR point cloud using techniques known in the art. In some examples, the LiDAR system 310 may comprise a number of 64-beam LiDAR units, for example, 5 or more LiDAR units. When the desired resolution of the LiDAR point cloud to be generated by the LiDAR system 310 is higher than the resolution of the LiDAR point cloud generated natively by the available LiDAR units (such as the output of a single 64-beam LiDAR unit), the LiDAR system 310 may comprise multiple LiDAR units. The individual LiDAR point clouds generated by each of the multiple LiDAR units are then combined to generate a super-resolution LiDAR point cloud. The term "super-resolution" is understood by persons skilled in the art to mean an enhanced resolution greater than the native resolution capable of the sensor system. The individual LiDAR point clouds may be combined to generate the super-resolution LiDAR point cloud using one of a number of different combining algorithms, such as the K-Nearest Neighbors (KNN) algorithm.

The camera system 320 comprises one or more cameras, typically high resolution cameras. In the presently described embodiment, the one or more cameras are stereo cameras that provide a low accuracy stereo camera point cloud, typically a high resolution, low accuracy stereo camera point cloud. In other embodiments, mono cameras may be used instead of stereo cameras.

The LiDAR system 310 and camera system 320 are coupled to the pre-processing module 330 and provide the high resolution LiDAR point cloud and the low accuracy stereo camera point cloud. The pre-processing module 330 uses the high resolution, high accuracy LiDAR point cloud as reference which provides ground truth data used for training the pre-processing module 330 to generate the corrected point cloud from the low accuracy stereo camera point cloud. The pre-processing module 330 outputs the corrected point cloud to the point cloud processing module 340 which utilizes the corrected point cloud in one or more machine learning algorithms, such as an object detection algorithm, dynamic object removal algorithm, simultaneous localization and mapping (SLAM) algorithm, a point cloud map generation algorithm, a high definition map creation algorithm, a localization algorithm, a semantic mapping algorithm, tracking algorithm or scene reconstruction algorithm, which can be used to generate a 3D representation of an environment. The pre-processing module 330 and point cloud processing module 340 are software modules of the computer vision module 172 as described above.

Figure 8:
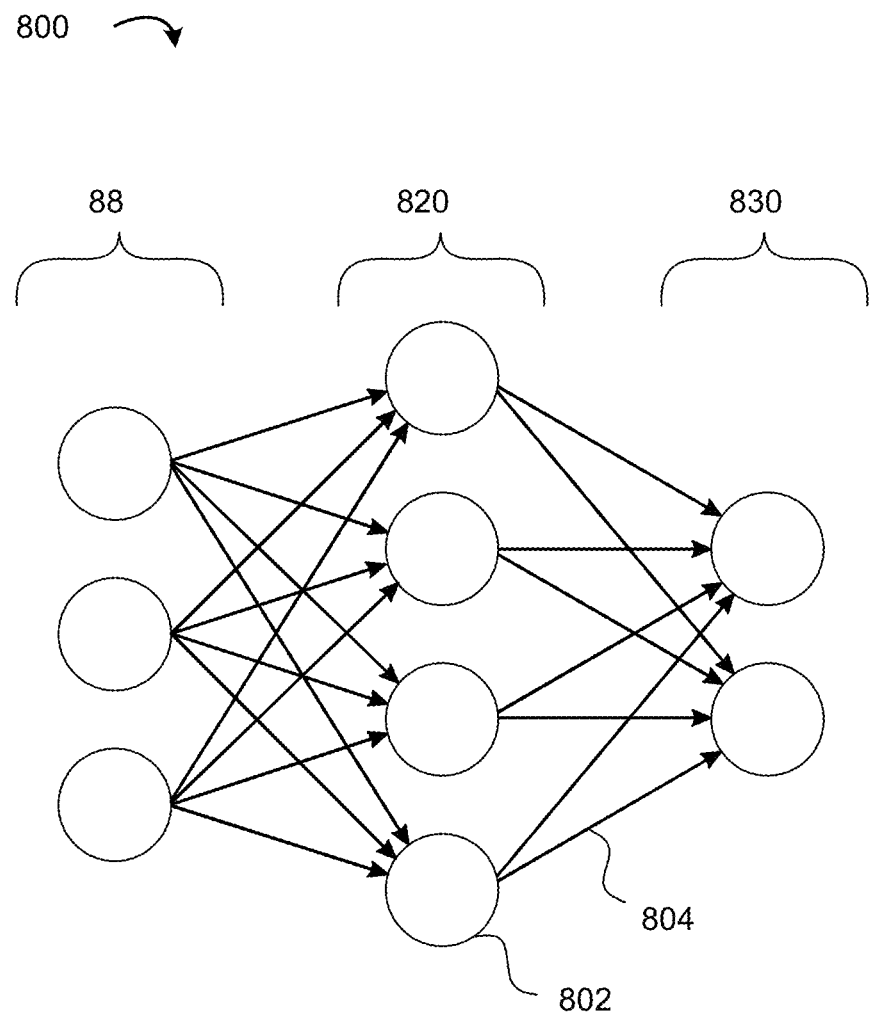
FIG. 8 is a schematic diagram illustrating a neutral network.

The pre-processing module 330 is trained as described below. The training of the pre-processing module 330 may be done at the same time as other calibration procedures of the computer vision system 300. The pre-processing module 330 may be, or comprise, a neural network in at least some embodiments. In other embodiments, the pre-processing module 330 may be, or comprise, another type of machine-learning based controller, processor or system that implements a machine learning algorithm to train the pre-processing module to generate corrected point clouds as described below. Referring briefly to FIG. 8, an example neural network 800 will be described. The neural network 800 comprises a number of nodes (also known as neurons) 802 arranged in a plurality layers comprising an input layer 810, one or more middle (hidden) layers 820 (only one of which is shown for simplicity), and an output layer 830. Each of the layers 810, 820 and 830 is a grouping of one or more nodes that are independent of each other and which allow for parallel computing.

The output of each node 802 in a given layer is connected to the output of one or more nodes 802 in a subsequent layer, as indicated by connections 804 (only one of which is labelled in FIG. 8). Each node 802 is a logical programming unit that performs an activation function (also known as a transfer function) for transforming or manipulating data based on its inputs, a weight (if any) and bias factor(s) (if any) to generate an output. The activation function of each node 802 results in a particular output in response to particular input(s), weight(s) and bias(es). The inputs of each node 802 may be scalar, vectors, matrices, objects, data structures and/or other items or references thereto. Each node 802 may store its respective activation function, weighting (if any) and bias factors (if any) independent of other nodes.

Examples of activation functions include mathematical functions (i.e. addition, subtraction, multiplication, divisions, convolution, etc.), object manipulation functions (i.e. creating an object, modifying an object, deleting an object, appending objects, etc.), data structure manipulation functions (i.e. creating a data structure, modifying a data structure, deleting a data structure, creating a data field, modifying a data field, deleting a data field, etc.), and/or other transformation functions depending on the type of input(s). In some examples, the activation function comprises one or both of summing or mapping functions.

Each node of the input layer 810 receives sensor data from the LiDAR system 310 and camera system 320. A weight may be set for each of the one or more of the inputs of the input layer 810 and subsequent nodes of the middle layers 820 and the output layer 830 of the neural network 800. A weight is a numerical value, usually between 0 and 1, that indicates the connection strength between a node in one layer and a node in a subsequent layer. A bias may also be set for each of the inputs of the input layers 810 and subsequent nodes of the middle layers 820 and the output layer 830 of the neural network 800.

A scalar product between each input of the input layer 810 and its respective weight and bias are determined and sent to a respective node of the first middle layers 820 as input. Each of the scalar products are concatenated into another vector, and another scalar product between the input of the first middle layer and its respective weight and bias is determined and sent to a node of the second middle layer 820 as input, if more than one middle layer exists. This process is repeated in sequence through each of the middle layers 820 up to the output layer 830.

The number of middle layers 820, the number nodes in each of the layers 810, 820 and 830, and the connections between the nodes of each layer may vary between embodiments based on the input(s) (e.g., sensor data) and output(s) (e.g., the corrected point cloud) to the processing module 340. The weight and bias of each node and possibly even the activation function of the nodes of the neural network 800 are determined for optimal performance through training (e.g. a learning process), as described below.

Figure 4A:
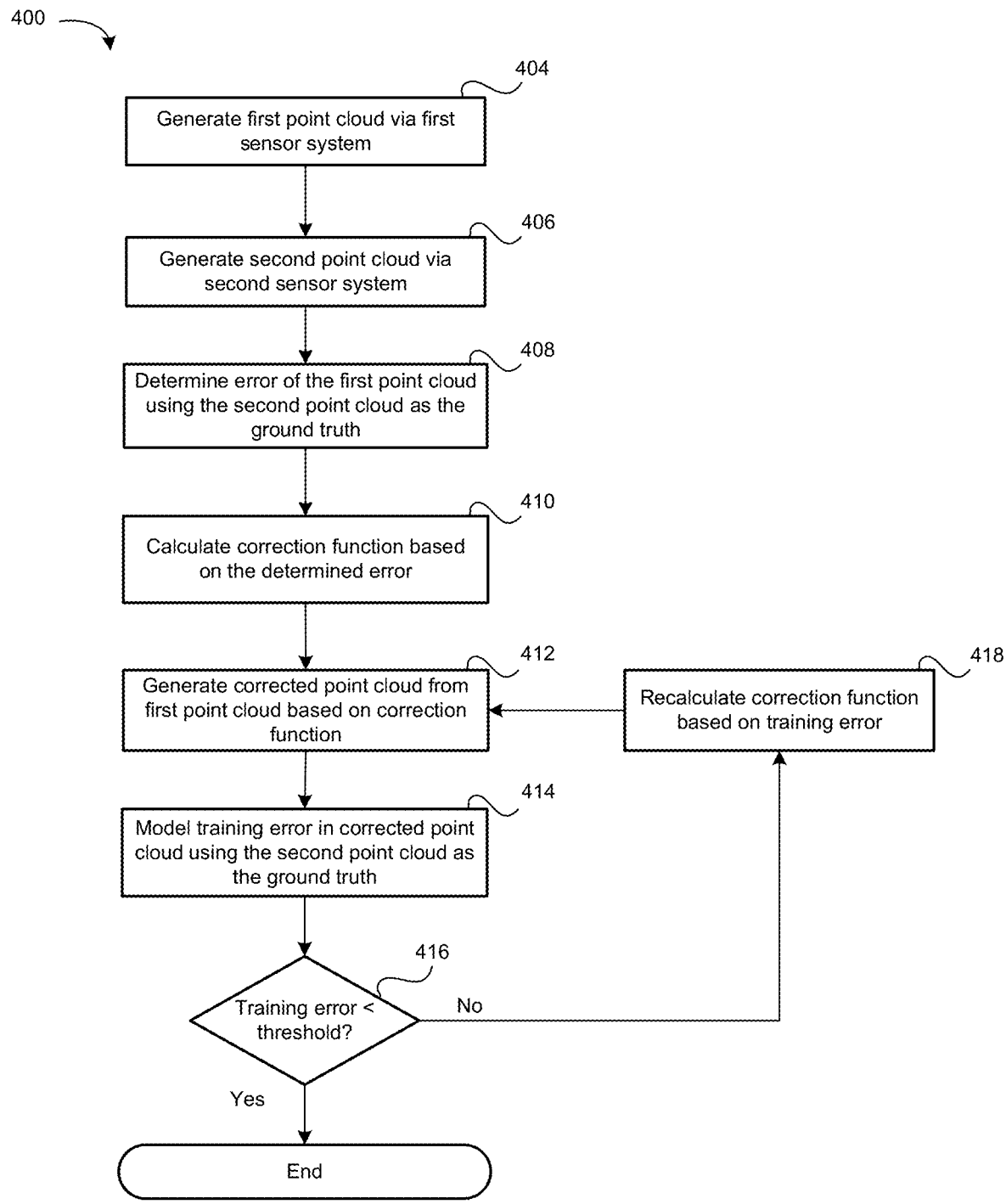
FIGS. 4A and 4B are flowcharts of a method of training a pre-processing module to generate a corrected point cloud in accordance with example embodiments of the present disclosure.

Referring to FIG. 4A, a method 400 of training pre-processing module 330 to generate a corrected point cloud in accordance with one example embodiment of the present disclosure will be described. At least parts of the method 400 are carried out by software executed by the processor system 102 of the vehicle control system 115. The method 400 is performed when a point cloud map learning mode of the computer vision system 300 of the vehicle 105 is activated (or engaged) by an operator. The point cloud map learning mode may be activated through interaction with a human-machine interface device (HMD) of the vehicle control system 115, such as voice activation via a pre-defined keyword combination or other user interaction, such as touch activation via a GUI of the computer vision system 300 displayed on the touchscreen 136.

At operation 404, the computer vision system 300 receives a first point cloud obtained by a first sensor system, such as the camera system 320. The first point cloud is also referred to as a camera point cloud. The first point cloud is typically generated by the camera system 320 and received by the processor system 102 as input. Alternatively, the computer vision system 300 may generate the first point cloud from digital images acquired from the camera system 320.

When the first point cloud is a camera-based point cloud, each point is defined by its position in space represented by x, y, and z coordinates and its color characteristics, which may be described as an RGB (red, green, blue) value or other suitable data value. As noted above, the camera system 320 is a low accuracy system, such as a high resolution, low resolution camera system, such that the first point cloud is a low accuracy point cloud. The computer vision system 300 senses the environment of the vehicle 105 using the camera system 320 to generate the first point cloud using computer vision techniques known in the art, the details of which are outside the scope of the present disclosure. An example of one computer vision technique for generating a stereo vision point cloud will be briefly described.

Figure 9:
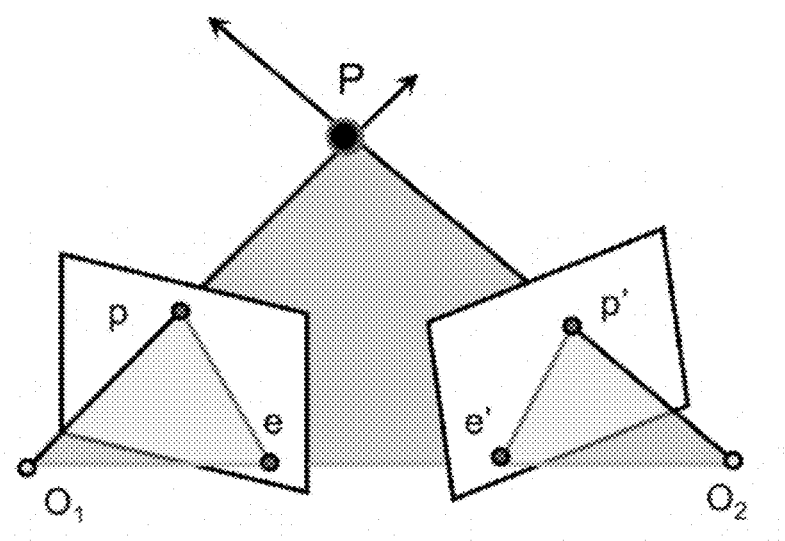
FIG. 9 is a schematic diagram illustrating epipolar geometry used in triangulation.

A stereo vision point cloud can be generated from images captured by a stereo camera, or two mono cameras, by applying triangulation (also referred to as reconstruction) techniques using epipolar geometry. A stereo camera views a 3D scene from two distinct positions. This creates a number of geometric relationships between the 3D points and the projections of the 3D points onto the 2D images captured by the stereo camera that lead to constraints between the image points. These relationships are derived by approximating each lens of the stereo camera (or each camera when two mono cameras as used) by the pinhole camera model. FIG. 9 is a schematic diagram illustrating an intersection point (P) of an environmental feature viewed by different camera lens each having a different field of view.

As illustrated in FIG. 9, the standard triangulation method using epipolar geometry calculation involves two cameras observing the same 3D point P, the intersection point, whose projection in each of the image planes is located at p and p' respectively. The camera centers are located at $O_1$ and $O_2$, and the line between the camera centers is referred to as the baseline. The lines between the camera centers $O_1$ and $O_2$ and the intersection point P are the projection lines. The plane defined by the two camera centers and P is the epipolar plane. The locations of wherein the baseline intersects the two image planes are known as the epipoles e and e'. The lines defined by the intersection of the epipolar plane and the two image planes are known as the epipolar lines. The epipolar lines intersect the baseline at the respective epipoles in the image plane. Given the corresponding image points p and p' and the geometry of the two camera, the projection lines can be determined, and the projection lines intersect at the 3D intersection point P. The 3D intersection point P can be determined using linear algebra in a straightforward way using known techniques.

Figure 10:
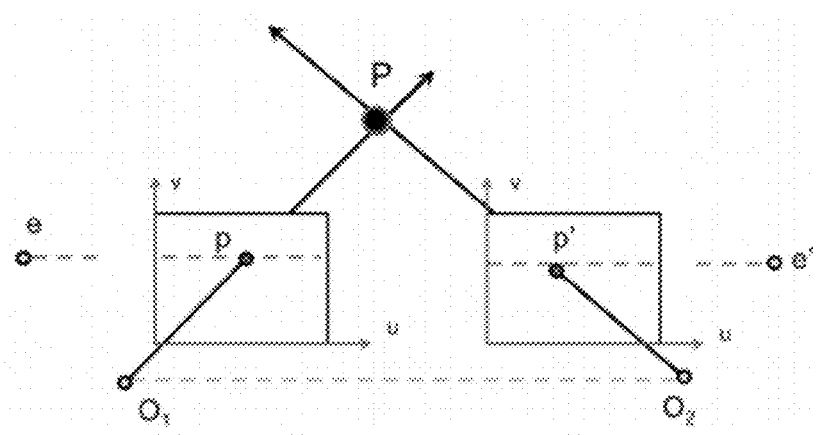
FIG. 10 is a schematic diagram illustrating epipolar geometry when the two image planes are parallel.

FIG. 10 illustrates epipolar geometry when the image planes are parallel to each other. When the image planes are parallel to each other, the epipoles e and e' are located at infinity because the baseline joining the centers $O_1$, $O_2$ is parallel to the image planes, and the epipolar lines are parallel to an axis of each image plane.

To perform triangulation, the parameters of the each camera projection function from 3D to 2D for each of the cameras involved is required. This may be represented by the camera matrices. A camera matrix or (camera) projection matrix is a 3×4 matrix that describes the mapping of a pinhole camera from 3D points in the world to 2D points in an image. If x is a representation of a 3D point in homogeneous coordinates (a 4-dimensional vector), and y is a representation of the image of this point in the pinhole camera (a 3-dimensional vector), the following relation holds:

$$y = Cx \quad (1)$$

wherein C is the camera matrix, and C is defined by the following equation:

$$C = \begin{pmatrix} f & 0 & 0 & 0 \\ 0 & f & 0 & 0 \\ 0 & 0 & 1 & 0 \end{pmatrix} \quad (2)$$

wherein f is the camera's focal length, wherein f>0.

Because each point in a 2D image corresponds to a line in 3D space, all points on the line in 3D are projected to the point in the 2D image. If a pair of corresponding points in two, or more images, may be found it must be the case that they are the projection of a common 3D point P, the intersection point. The set of lines generated by the image points must intersect at P (3D point) and the algebraic formulation of the coordinates of P (3D point) may be computed in a variety of ways, which are known in the art such as the mid-point method and direct linear transformation.

At operation 406, the computer vision system 300 generates a second point cloud using a second sensor system, such as the LiDAR system 310. The second point cloud is a high resolution, high accuracy point cloud. The second point cloud is also referred to as a LiDAR point cloud. The second point cloud is typically generated by the LiDAR system 310 and received by the processor system 102 as input. The second point cloud may be generated contemporaneously with the first point cloud. Alternatively, the second point cloud may be generated in advance and provided to the computer vision system 300 when the second point cloud was generated by the LiDAR system 310 in the same environment (which may be testing or reference room) and from the same reference position (e.g., same location and orientation) within the environment as when the first point cloud was generated by the camera system 320.

At operation 408, the pre-processing module 330 receives the first point cloud and second point cloud and determines an error of the first point cloud using the second point cloud as the ground truth. In at least some embodiments, the pre-processing module 330 generates a mathematical representation (e.g., models) the error of the first point cloud. The mathematical representation of the error is based on a difference between matching coordinates of the first point cloud and second point cloud. The mathematical representation of the error may define a common error applicable to all data points in the first point cloud or a variable error that varies across the first point cloud, uniformly or non-uniformly. As a preliminary step to generating the mathematical representation (e.g., modeling) of the error, data points of the LiDAR point cloud are matched (e.g., associated, mapped, etc.) to data points from the stereo camera point cloud. For example, in some embodiments the data points of the LiDAR point cloud may be matched to data points from the stereo camera point cloud using the KNN algorithm mentioned above. The pre-processing module 330 is provided with two point clouds: both are high resolution but one has a lower accuracy than the other. The KNN algorithm may be used to find the best KNN match between each point of the low accuracy point cloud and its K nearest neighbors in the high accuracy point cloud. Other matching, mapping or interpolation algorithms/learning-based algorithms may be used in other embodiments.

At operation 410, the pre-processing module 330 determines a correction function based on the determined error, for example, based on a mathematical representation of the error of the first point cloud using the second point cloud as the ground truth. The correction function may a correction vector that is applied to all data points in the first point cloud, a number of different correction vectors that are applied to different data points in the first point cloud, or a variable correction function is varies non-uniformly across the first point cloud, among many possibilities.

At operation 412, the pre-processing module 330 generates a corrected point cloud from the first point cloud using the correction function.

At operation 414, the pre-processing module 330 generates a mathematical representation of the training error between the corrected point cloud and the second point cloud using the second point cloud as the ground truth. The mathematical representation of the training error is based on a difference between matching coordinates of the corrected point cloud and second point cloud.

At operation 416, the pre-processing module 330 determines whether the training error is less than an error threshold. When the training error is less than the error threshold, the correction function is considered to be trained and the method 400 ends. When the training error is greater than or equal than the error threshold, processing proceeds to operation 418 at which the correction function is recalculated. When the pre-processing module 330 is a neural network used to train the correction function, the correction function may be recalculated by backpropagating the training error through the neural network by updating parameters, such as weights, of the neural network to minimize the training error.

Figure 3B:
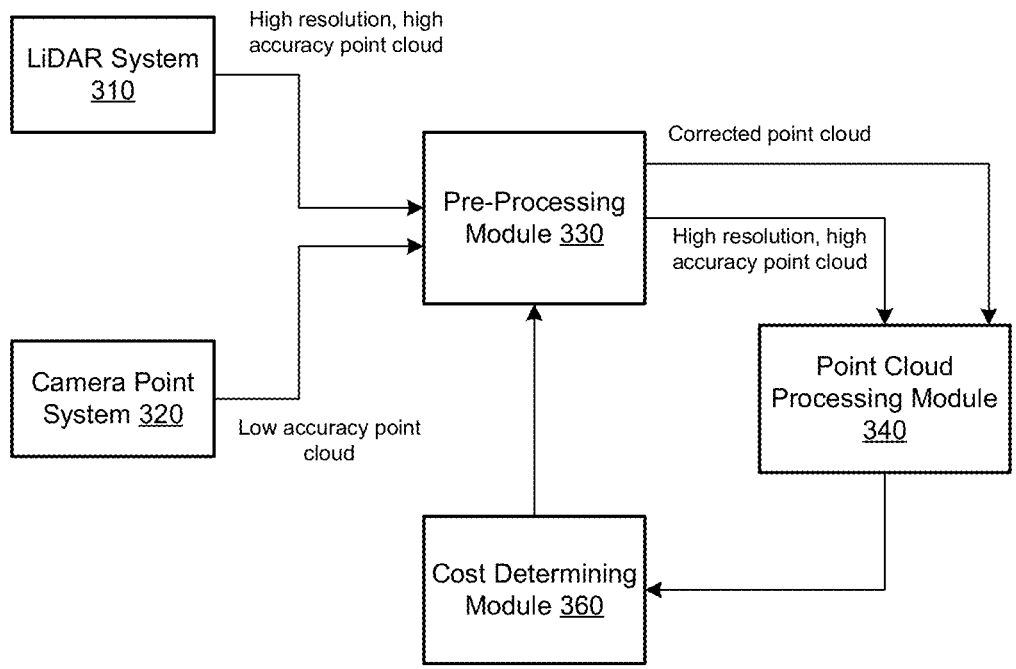

Reference is next made to FIG. 3B which illustrates a simplified block diagram of a computer vision system 350 for training a pre-processing module 330 to generate a corrected point cloud in accordance with another example embodiment of the present disclosure. The computer vision system 350 differs from the computer vision system 300 in that a merged training based on one or more machine learning algorithms that process point cloud data (such as one or more of an object detection algorithm, dynamic object removal algorithm, simultaneous localization and mapping (SLAM) algorithm, a point cloud map generation algorithm, a high definition map creation algorithm, a LiDAR-based localization algorithm, a semantic mapping algorithm, tracking algorithm or scene reconstruction algorithm) is performed. The output of the processing module 340 may be used to generate a 3D representation of the environment, which can be displayed on the touchscreen 136. The merged training may further improve the final result (e.g. 3D representation of an environment) from the specific point cloud application using the corrected point cloud because some errors in the high resolution/high accuracy point cloud generated by the computer vision system may be more or less tolerable than others depending on the specific point cloud application algorithm(s), thereby having improving the performance of the computer vision system for its intended applications.

The computer vision system 350 comprises the LiDAR system 310, camera system 320, pre-processing module 330 and point cloud processing module 340 of the computer vision system 300 but also includes a cost (or loss) determining module 360. The cost determining module 360 may be a hardware module or software module 168, such as a software module of the computer vision module 172. The merged training is performed in an end-to-end fashion with the cost determining module 360 determining a "cost" associated the training error based on the calculation of a specific point cloud application algorithm with data points from the corrected point cloud and data points from the second point cloud. The cost is determined by a cost function (or loss function) for training the pre-processing module 330. The cost function is an objective function that maps values of the output of the specific point cloud application algorithm to a real number representing a "cost" associated with the values. The cost function may be a point cloud application algorithm cost function or a combination of the point cloud application algorithm cost function and a pre-processing module cost function. The cost function may output a cost (or loss) based on a weighted combination of the losses for pre-processing module and the point cloud application algorithm. The cost function is defined by an artificial intelligence/neural network designer, the particulars of which are outside the scope of the present disclosure. When desiring improved performance from the specific point cloud application algorithm(s), merged training may assist in improving the general performance.

Figure 4B:
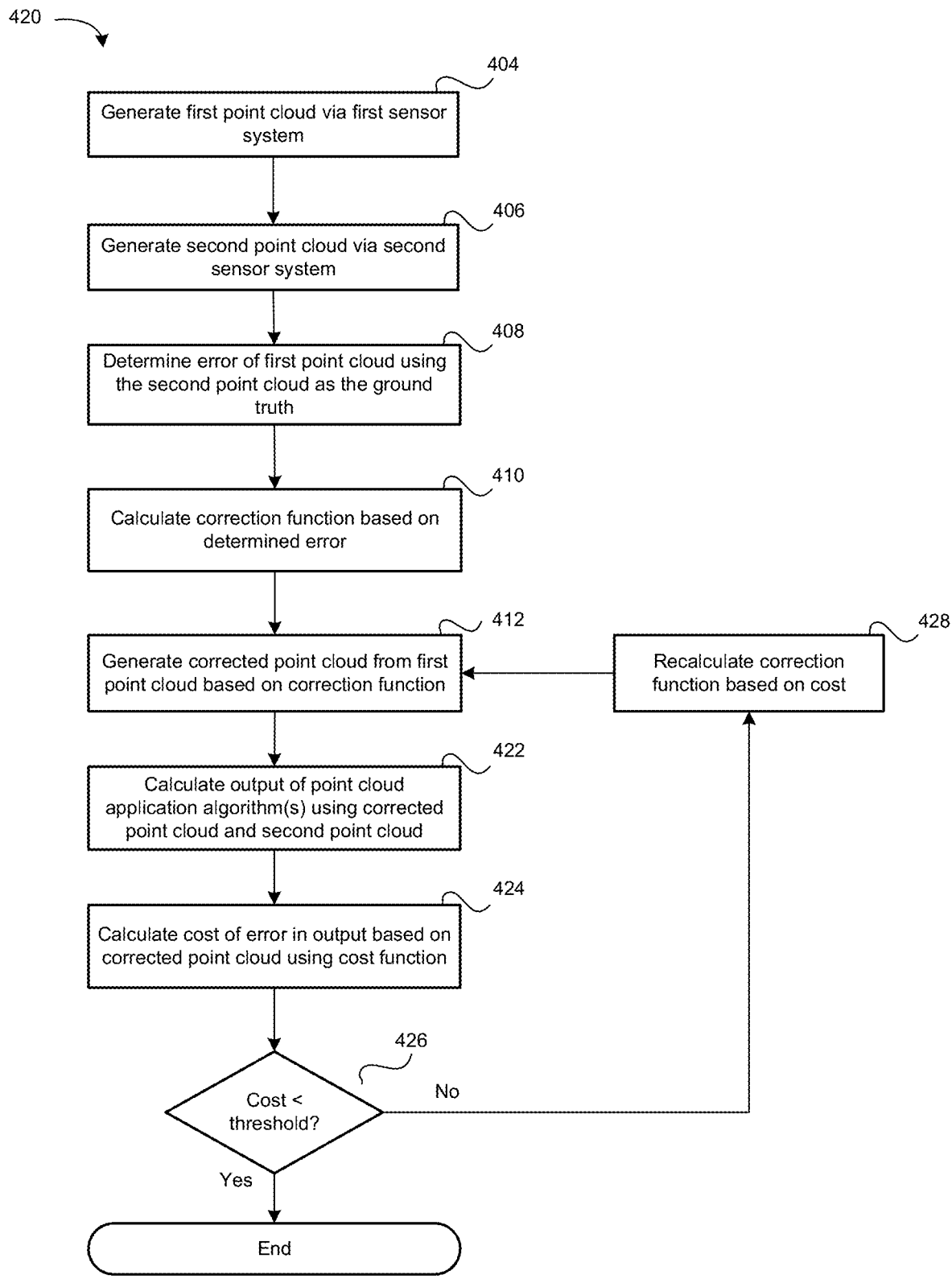

Referring to FIG. 4B, a method 420 of training a pre-processing module 330 to generate a corrected point cloud in accordance with another example embodiment of the present disclosure will be described. At least parts of the method 420 are carried out by software executed by the processor system 102 of the vehicle control system 115. The method 420 is similar to the method 400 except that a merged training is performed, as described above.

After the corrected point cloud is generated in operation 412, at operation 422 the pre-processing module 330 calculates the output of the specific point cloud application algorithm(s) using corrected point cloud and the second point cloud.

At operation 424, the pre-processing module 330 determines (e.g., calculates) a cost as the output of the cost function based on the output of the specific point cloud application algorithm(s) using corrected point cloud and the output of the specific point cloud application algorithm(s) using the second point cloud as the ground truth. The calculated "cost" represents the cost of error in the output of the point cloud application algorithm using corrected point cloud rather than the second point cloud.

At operation 426, the pre-processing module 330 determines whether the cost is less than a cost threshold. When the cost is less than the cost threshold, the cost is considered to be been minimized and the correction function is considered to be trained and the method 420 ends. When the cost is greater than or equal than the cost threshold, processing proceeds to operation 428 at which the correction function is recalculated. When the pre-processing module 330 is a neural network used to train the correction function, the correction function may be recalculated by backpropagating the training error through the neural network by updating parameters, such as weights, of the neural network to minimize the cost determined the cost function. In some examples, the parameters, such as weights, of the neural network may be updated to minimize a mean square error (MSE) between the output of the specific point cloud application algorithm(s) using corrected point cloud and the second point cloud.

Although the use of a cost function as the objective function in which the cost is to minimized when solving an optimization problem is described above, in other embodiments the objective function may be a reward function, a profit function, a utility function or a fitness function, etc. in which the output of the objective function is maximized rather than minimized when solving the optimization problem.

Figure 5A:
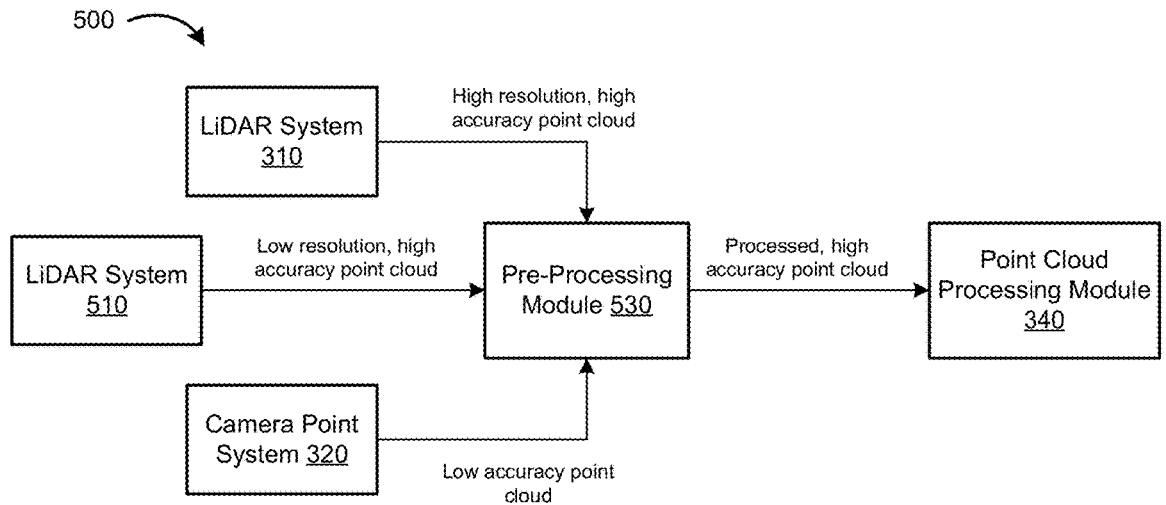
FIGS. 5A and 5B are simplified block diagrams of a computer vision system for training a pre-processing module to generate a corrected point cloud in accordance with other example embodiments of the present disclosure.

Reference is next made to FIG. 5A which illustrates a simplified block diagram of a computer vision system 500 for training the learning-based pre-processing module 530 (hereinafter preprocess-module 530) to generate a corrected point cloud in accordance with another example embodiment of the present disclosure. The computer vision system 500 is similar to the computer vision system 300 described above except that it also comprises a low resolution LiDAR system 510 comprising one or more LiDAR units 114.

The computer vision system 500 is intended for training the pre-processing module 530. The training is intended to train the pre-processing module 530 to generate a high resolution and high accuracy point cloud in real-time or near real-time using the low resolution LiDAR system 510 and the camera system 320. In some examples, the high resolution, high accuracy LiDAR system 310 may comprise one or more 64-beam (or greater) LiDAR units whereas the low resolution LiDAR system 510 comprises one or more 8, 16, or 32-beam LiDAR units. The camera system 320 and the low resolution LiDAR system 510 are relatively inexpensive relative to the high resolution, high accuracy LiDAR system 310. The trained pre-processing module 530 may be used in a production vehicle, such as the vehicle 105, comprising a low accuracy sensor system such as a camera system and/or a low resolution system such as a low resolution LiDAR subsystem 510.

The pre-processing module 530 is trained in stages as described below. The training of the pre-processing module 530 may be done at the same time as other calibration procedures of the computer vision system 500. The pre-processing module 530 may be, or comprise, a neural network in at least some embodiments. In other embodiments, the pre-processing module 530 may be, or comprise, another type of machine-learning based controller, processor or system. The pre-processing module 530 is first trained with low resolution/high accuracy data from the low resolution LiDAR system 510, and trained again with high resolution/high accuracy data from the high resolution LiDAR system 310 to fine-tune the correction function of the pre-processing module 530.

Figure 6A:
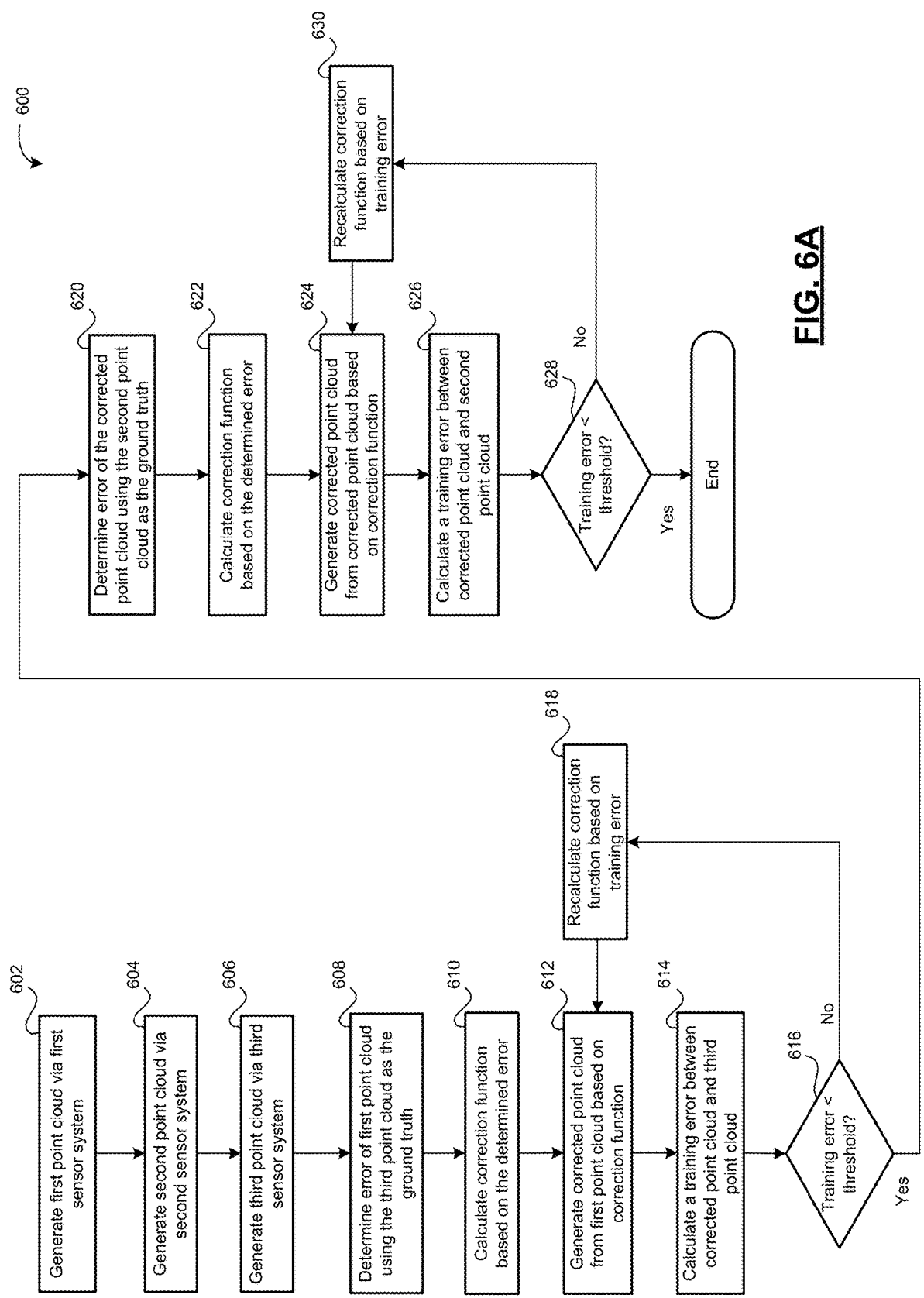
FIGS. 6A and 6B are flowcharts of a method of training a pre-processing module to generate a corrected point cloud in accordance with other example embodiment of the present disclosure.

Referring to FIG. 6A, a method 600 of training a pre-processing module 530 to generate a corrected point cloud in accordance with another example embodiment of the present disclosure will be described. At least parts of the method 600 are carried out by software executed by the processor system 102 of the vehicle control system 115. The method 600 is similar to the method 400 except that a merged training is performed, as described above.

At operation 602, the computer vision system 500 generates a first point cloud using a first sensor system, such as the camera system 320.

At operation 604, the computer vision system 500 generates a second point cloud using a second sensor system, such as the LiDAR system 310. The second point cloud is a high resolution, high accuracy point cloud. The second point cloud may be generated contemporaneously with the first point cloud. Alternatively, the second point cloud may be generated in advance and provided to the computer vision system 500 when the second point cloud was generated by the LiDAR system 310 in the same environment (which may be testing or reference room) and from the same reference position (e.g., same location and orientation) within the environment as when the first point cloud was generated by the camera system 320.

At operation 606, the computer vision system 500 generates a third point cloud using a third sensor system, such as the LiDAR system 510. The third point cloud is a low resolution, high accuracy point cloud. The third point cloud is also referred to as a LiDAR point cloud. The third point cloud is typically generated by the LiDAR system 510 and received by the processor system 102 as input. The third point cloud may be generated contemporaneously with the first point cloud and second point cloud. Alternatively, the third point cloud may be generated in advance and provided to the computer vision system 500 when the third point cloud was generated by the LiDAR system 510 in the same environment (which may be testing or reference room) and from the same reference position (e.g., same location and orientation) within the environment as when the first point cloud and second point cloud were generated.

At operation 608, the pre-processing module 530 determines an error of the first point cloud using the third point cloud of the low resolution LiDAR system 510 as the ground truth. In at least some embodiments, the pre-processing module 530 generates a mathematical representation (e.g., model) of the error over the first point cloud. The mathematical representation of the error is based on a difference between matching coordinates of the first point cloud and third point cloud similar to operation 408.

At operation 610, the pre-processing module 330 determines a correction function based on the determined error, for example, based on the mathematical representation of the error defining the error of the first point cloud using the third point cloud as the ground truth similar to operation 410.

At operation 612, the pre-processing module 530 generates a corrected point cloud from the first point cloud using the correction function.

At operation 614, the pre-processing module 530 generates a mathematical representation (e.g., models) of the training error between the corrected point cloud and the third point cloud using the third point cloud as the ground truth. The mathematical representation of the training error is based on a difference between matching coordinates of the corrected point cloud and third point cloud.

At operation 616, the pre-processing module 530 determines whether the training error is less than an error threshold. When the training error is less than the error threshold, the first stage of training the correction function is considered to be completed and the method 600 process to the second stage of training at operation 620. When the training error is greater than or equal than the error threshold, processing proceeds to operation 618 at which the correction function is recalculated. When the pre-processing module 530 is a neural network used to train the correction function, the correction function may be recalculated by backpropagating the training error through the neural network by updating parameters, such as weights, of the neural network to minimize the training error.

At operation 620, when the first stage of training the correction function is considered to be completed, the pre-processing module 530 generates a mathematical representation (e.g., models) the error of the corrected point cloud using the second point cloud of the high resolution, high accuracy LiDAR system 310 as the ground truth. The mathematical representation of the error is based on a difference between matching coordinates of the first point cloud and second point cloud similar to operations 408 and 608.

At operation 622, the pre-processing module 330 determines a correction function based on the mathematical representation of the error defining the error of the first point cloud using the second point cloud as the ground truth similar to operations 410 and 610.

At operation 624, the pre-processing module 530 generates a corrected point cloud from the first point cloud using the correction function.

At operation 626, the pre-processing module 530 generates a mathematical representation (e.g., models) the training error between the corrected point cloud and the second point cloud using the second point cloud as the ground truth. The mathematical representation of the training error is based on a difference between matching coordinates of the corrected point cloud and second point cloud.

At operation 628, the pre-processing module 530 determines whether the training error is less than an error threshold. When the training error is less than the error threshold, the training the correction function is considered to be completed and the method 600 ends. When the training error is greater than or equal than the error threshold, processing proceeds to operation 630 at which the correction function is recalculated. When the pre-processing module 530 is a neural network used to train the correction function, the correction function may be recalculated by backpropagating the training error through the neural network by updating parameters, such as weights of the neural network to minimize the training error.

Figure 5B:
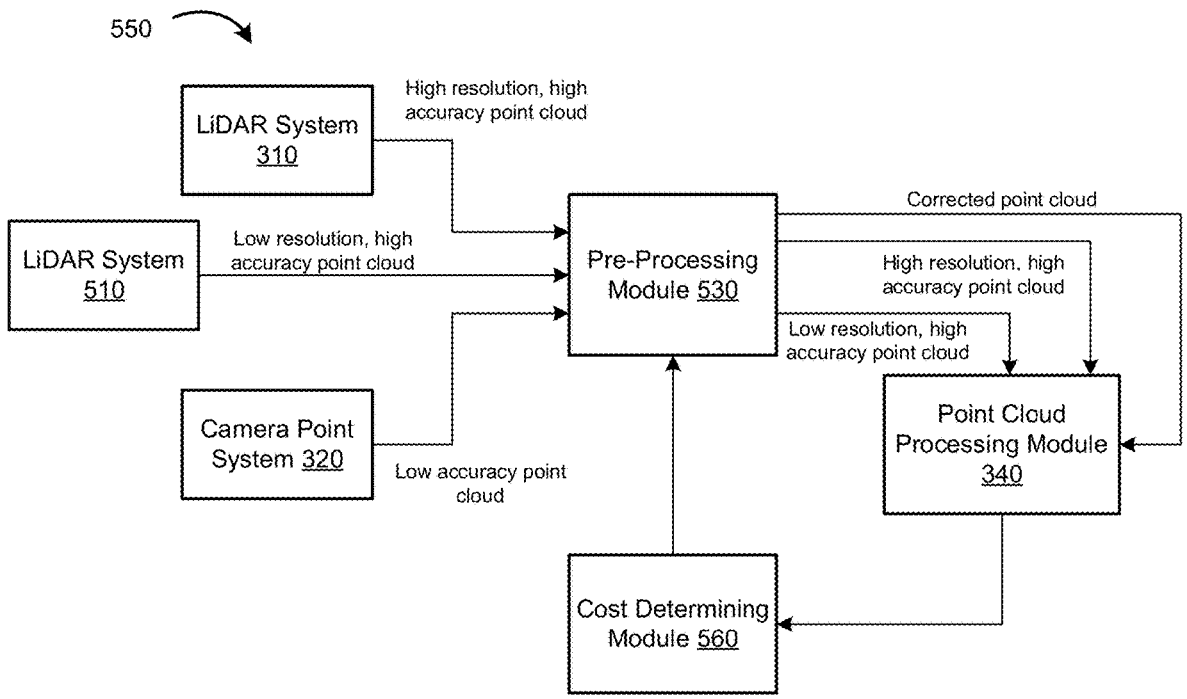

Reference is next made to FIG. 5B which illustrates a simplified block diagram of a computer vision system 550 for training a pre-processing module 530 to generate a corrected point cloud in accordance with another example embodiment of the present disclosure. The computer vision system 550 differs from the computer vision system 500 in that a merged training based on one or more point cloud application algorithms (such as one or more of an object detection algorithm, dynamic object removal algorithm, simultaneous localization and mapping (SLAM) algorithm, a point cloud map generation algorithm, a high definition map creation algorithm, a LiDAR-based localization algorithm, a semantic mapping algorithm, tracking algorithm or scene reconstruction algorithm) is performed.

The computer vision system 550 comprises the high resolution, high accuracy LiDAR system 310, low resolution LiDAR system 510, camera system 320, pre-processing module 530 and point cloud processing module 340 of the computer vision system 500 but also includes a cost (or loss) determining module 560 similar to the cost determining module 360.

Figure 6B:
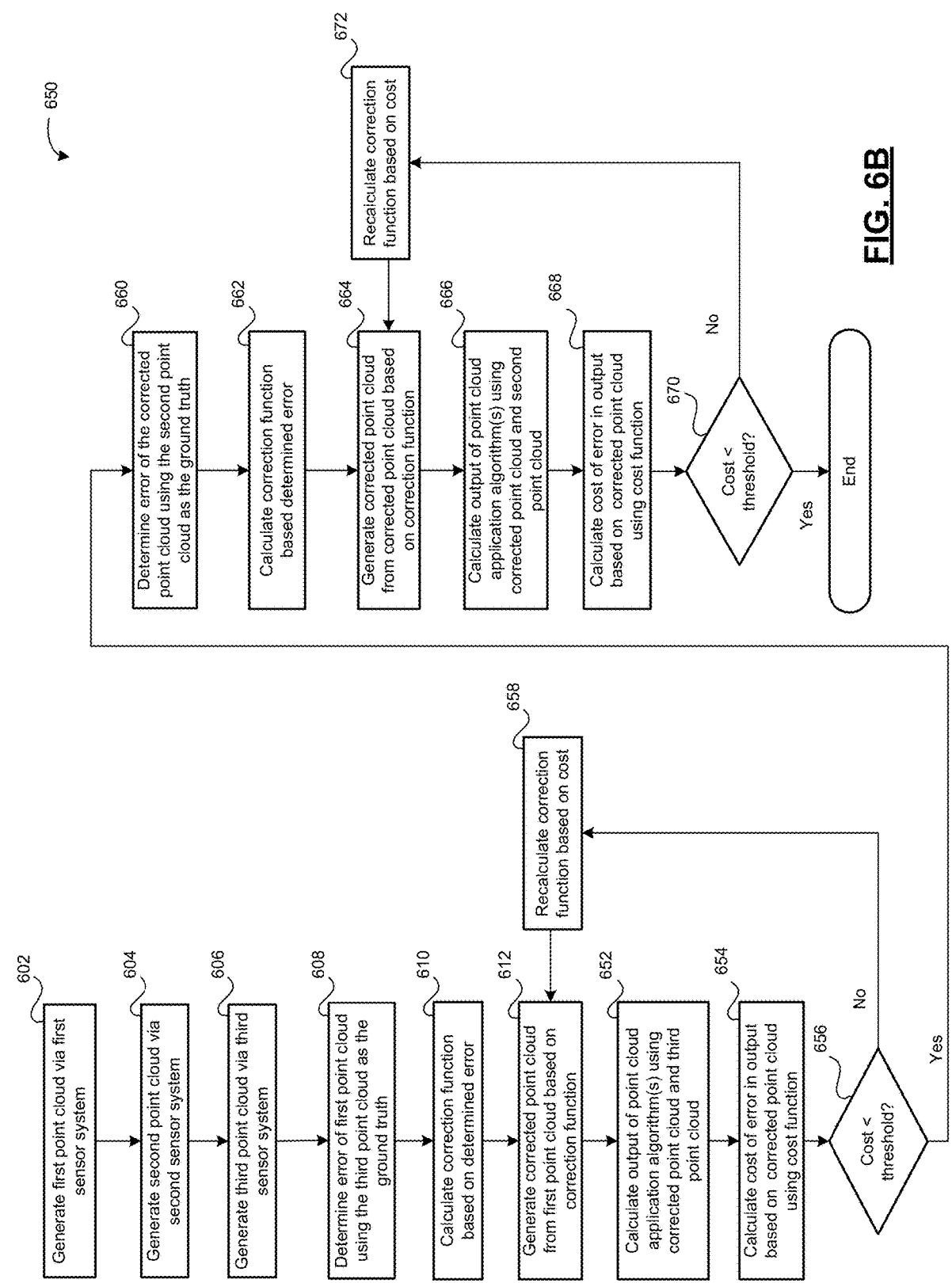

Referring to FIG. 6B, a method 650 of training a pre-processing module 530 to generate a corrected point cloud in accordance with another example embodiment of the present disclosure will be described. At least parts of the method 650 are carried out by software executed by the processor system 102 of the vehicle control system 115. The method 650 is similar to the method 600 except that a merged training is performed.

After the corrected point cloud is generated in operation 612, at operation 652 the pre-processing module 530 calculates the output of the specific point cloud application algorithm(s) using corrected point cloud and the third point cloud.

At operation 654, the pre-processing module 530 determines (e.g., calculates) a cost as the output of the cost function based on the output of the specific point cloud application algorithm(s) using corrected point cloud and the output of the specific point cloud application algorithm(s) using the third point cloud as the ground truth. The calculated "cost" represents the cost of error in the output of the point cloud application algorithm using corrected point cloud rather than the third point cloud.

At operation 656, the pre-processing module 530 determines whether the cost is less than a cost threshold. When the cost is less than the cost threshold, the cost is considered to be been minimized and the first stage of the training of the correction function is considered to be completed, and the method 650 proceed to operation 660. When the cost is greater than or equal than the cost threshold, processing proceeds to operation 658 at which the correction function is recalculated. When the pre-processing module 530 is a neural network used to train the correction function, the correction function may be recalculated by backpropagating the training error through the neural network by updating parameters, such as weights of the neural network to minimize the cost determined the cost function. In some examples, the parameters, such as weights, of the neural network may be updated to minimize a mean square error (MSE) between the output of the specific point cloud application algorithm(s) using corrected point cloud and the second point cloud.

At operation 660, when the first stage of training the correction function is considered to be completed, the pre-processing module 530 generates a mathematical representation (e.g., models) of the error of the corrected point cloud using the second point cloud of the high resolution, high accuracy LiDAR system 310 as the ground truth. The mathematical representation of the error is based on a difference between matching coordinates of the first point cloud and second point cloud similar to operations 408 and 608.

At operation 662, the pre-processing module 530 determines a correction function based on the mathematical representation of the error defining the error of the first point cloud using the second point cloud as the ground truth similar to operations 410 and 610.

At operation 664, the pre-processing module 530 generates a corrected point cloud from the first point cloud using the correction function.

At operation 666, the pre-processing module 530 calculates the output of the specific point cloud application algorithm(s) using corrected point cloud and the second point cloud.

At operation 668, the pre-processing module 530 determines (e.g., calculates) a cost as the output of the cost function based on the output of the specific point cloud application algorithm(s) using corrected point cloud and the output of the specific point cloud application algorithm(s) using the second point cloud as the ground truth. The calculated "cost" represents the cost of error in the output of the point cloud application algorithm using corrected point cloud rather than the second point cloud.

At operation 670, the pre-processing module 530 determines whether the cost is less than a cost threshold. When the cost is less than the cost threshold, the cost is considered to be been minimized and the correction function is considered to be trained and the method 650 ends. When the cost is greater than or equal than the cost threshold, processing proceeds to operation 672 at which the correction function is recalculated. When the pre-processing module 330 is a neural network used to train the correction function, the correction function may be recalculated by backpropagating the training error through the neural network by updating parameters, such as weights, of the neural network to minimize the cost determined the cost function. In some examples, the parameters, such as weights, of the neural network may be updated to minimize a mean square error (MSE) between the output of the specific point cloud application algorithm(s) using corrected point cloud and the second point cloud.

Although the use of a cost function as the objective function in which the cost is to minimized when solving an optimization problem is described above, in other embodiments the objective function may be a reward function, a profit function, a utility function or a fitness function, etc. in which the output of the objective function is maximized rather than minimized when solving the optimization problem.

Figure 7:
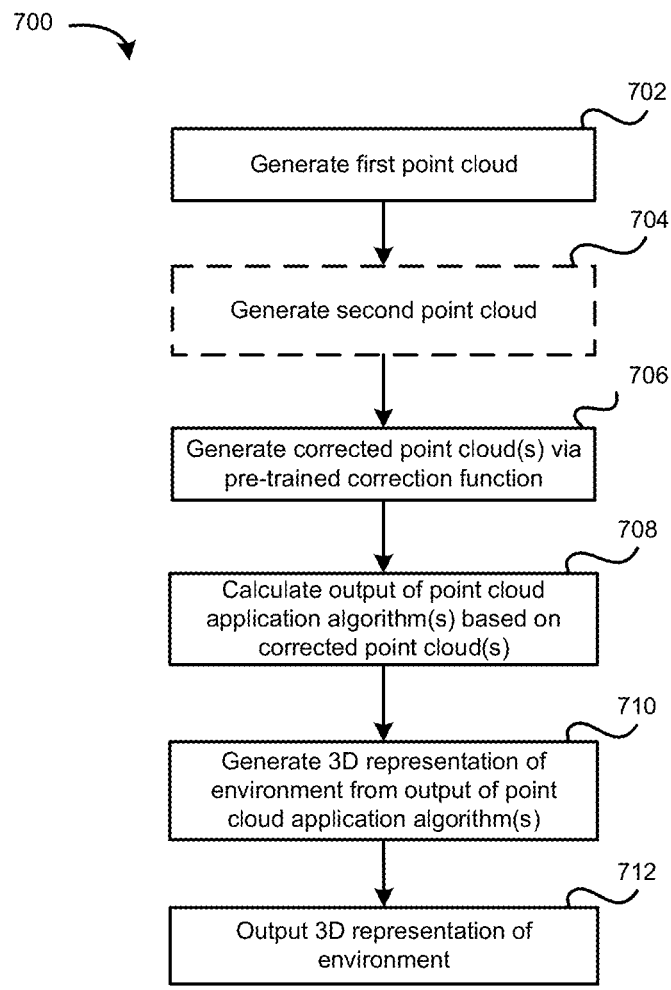
FIG. 7 is a flowchart of a method of generating a high resolution and high accuracy point cloud in accordance with one example embodiment of the present disclosure.

Referring to FIG. 7, a method 700 of generating a high resolution and high accuracy point cloud using a trained pre-processing module 330 or 530 in accordance with one example embodiment of the present disclosure will be described. At least parts of the method 700 are carried out by software executed by the processor system 102 of the vehicle control system 115.

At operation 702, the processor system 102 generates a first point cloud using a first sensor system, such as the camera system 320.

At operation 704, the processor system 102 generates a second point cloud using a second sensor system, such as a low resolution LiDAR system 510. This step is optional. In other embodiments, only the first point cloud is generated by the computer vision system.

At operation 706, the processor system 102 generates a corrected first point cloud and optionally a corrected second point cloud based on a respectively pre-trained correction function for camera system 320 or low resolution LiDAR system 510 described above.

At operation 708, the processor system 102 calculates the output of one or more specific point cloud application algorithm(s) based on the corrected point cloud(s), such as one or more of an object detection algorithm, dynamic object removal algorithm, SLAM algorithm, a point cloud map generation algorithm, a high definition map creation algorithm, a LiDAR-based localization algorithm, a semantic mapping algorithm, tracking algorithm or scene reconstruction algorithm, typically 3D but possibly in 2D.

At operation 710, the processor system 102 optionally generates a representation of the environment, typically in 3D such as a 3D map, based on the result/output of one or more point cloud application algorithm(s).

At operation 712, the processor system 102 outputs the 3D representation. The output may comprise displaying the 3D representation on a display such as the touchscreen 136, outputting the 3D representation to a vehicle driving assistance system or autonomous driving system, or a combination thereof. The vehicle driving assistance system or autonomous driving system is typically part of the vehicle control system 115, and may be implemented in software as described above.

With a trained pre-processing module 330 or 530, the high resolution, high accuracy LiDAR system 310 can be removed from the test vehicle or omitted from the production vehicle, which consequently helps reduce the cost of final product. Less expensive sensors, such as the camera system 320 and optionally low resolution LiDAR system 510, can be used as an alternative to the high resolution, high accuracy LiDAR system 310, which are often very expensive and infeasible to adopt for commercial purposes. The high resolution and high accuracy point cloud generated by the trained pre-processing module 330 or 530 may be used by any machine learning algorithm(s) that process point cloud data to produce an accurate result, which may be used to produce an accurate 3D representation of an environment.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer vision system, comprising:
    a processor system;
    a memory coupled to the processor system, the memory tangibly storing thereon executable instructions that, in response to execution by the processor system, cause the computer vision system to:
    perform a first training phase in which the computer vision system is caused to:
    (i) receive a camera point cloud from a camera system;
    (ii) receive a first LiDAR point cloud from a first LiDAR system having a first resolution;
    (iii) determine a first error of the camera point cloud using the first LiDAR point cloud as a reference;
    (iv) determine a first correction function based on the determined first error;
    (v) generate a first corrected point cloud from the camera point cloud using the first correction function;
    (vi) determine a first training error of the first corrected point cloud using the first LiDAR point cloud as a reference; and
    (vii) update the first correction function based on the determined first training error; and
    perform a second training phase subsequent to the first training phase in which the computer vision system is caused to:
    (a) receive a second LiDAR point cloud from a second LiDAR system having a second resolution, wherein the second resolution of the second LiDAR system is higher than the first resolution of the first LiDAR system;
    (b) determine a second error of the first corrected point cloud using the second LiDAR point cloud as a reference;
    (c) determine a second correction function based on the determined second error;
    (d) generate a second corrected point cloud using the second correction function;
    (e) determine a second training error of the second corrected point cloud using the second LiDAR point cloud as a reference; and
    (f) update the second correction function based on the determined second training error.

2. The computer vision system of claim 1, wherein the executable instructions, in response to execution by the processor system, cause the computer vision system to repeat operations (v)-(vii) until the first training error is less than a first error threshold.

3. The computer vision system of claim 1, wherein the executable instructions to determine the first error of the camera point cloud using the first LiDAR point cloud as a reference and to determine the first correction function based on the determined first error, in response to execution by the processor system, cause the computer vision system to:
    generate a mathematical representation of the determined first error of the camera point cloud using the first LiDAR point cloud as a reference;
    determine the first correction function based on the mathematical representation of the determined first error;
    wherein the executable instructions to determine the first training error of the first corrected point cloud using the first LiDAR point cloud as a reference and to update the first correction function based on the determined first training error, in response to execution by the processor system, cause the computer vision system to:
    generate a mathematical representation of the first training error of the first corrected point cloud using the first LiDAR point cloud as a reference; and
    update the first correction function based on the mathematical representation of the first training error.

4. The computer vision system of claim 1, wherein the executable instructions, in response to execution by the processor system, cause the computer vision system to repeat operations (d)-(f) until the second training error is less than a second error threshold.

5. The computer vision system of claim 1, wherein the second LiDAR system comprises one or more 64-beam LiDAR units and the first LiDAR system comprises one or more 8-beam, 16-beam or 32-beam LiDAR units.

6. The computer vision system of claim 1, wherein the camera system is a stereo camera system and the camera point cloud is a stereo camera point cloud.

7. The computer vision system of claim 1, wherein the processor system comprises a neural network.

8. The computer vision system of claim 1, wherein the executable instructions to determine the second error of the camera point cloud using the second LiDAR point cloud as a reference and to determine the second correction function based on the determined second error, in response to execution by the processor system, cause the computer vision system to:
    generate a mathematical representation of the determined second error of the camera point cloud using the second LiDAR point cloud as a reference;
    determine the second correction function based on the mathematical representation of the determined second error;
    wherein the executable instructions to determine the second training error of the second corrected point cloud using the second LiDAR point cloud as a reference and to update the second correction function based on the determined second training error, in response to execution by the processor system, cause the computer vision system to:
    generate a mathematical representation of the second training error of the second corrected point cloud using the second LiDAR point cloud as a reference; and
    update the second correction function based on the mathematical representation of the second training error.

9. The computer vision system of claim 1, wherein the executable instructions, in response to execution by the processor system, cause the computer vision system to:
    (1) calculate an output of a point cloud application algorithm using the first corrected point cloud and an output of the point cloud application algorithm using the first LiDAR point cloud;
    (2) determine via a first cost function a first cost of error in the output of the point cloud application algorithm using the first corrected point cloud; and
    (3) update the first correction function based on the determined first cost.

10. The computer vision system of claim 9, wherein the executable instructions, in response to execution by the processor system, cause the computer vision system to repeat operations (1)-(3) until the first cost is less than a first cost threshold.

11. The computer vision system of claim 9, wherein the executable instructions, in response to execution by the processor system, cause the computer vision system to:
(4) calculate an output of the point cloud application algorithm using the second corrected point cloud and an output of the point cloud application algorithm using the second LiDAR point cloud;
(5) determine via a second cost function a second cost of error in the output of the point cloud application algorithm using the second corrected point cloud; and
(6) update the second correction function based on the determined second cost.

12. The computer vision system of claim 11, wherein the executable instructions, in response to execution by the processor system, cause the computer vision system to repeat operations (4)-(6) until the second cost is less than a second cost threshold.

13. A computer vision system, comprising:
a processor system;
a memory coupled to the processor system, the memory tangibly storing thereon executable instructions that, in response to execution by the processor system, cause the computer vision system to:
perform a first training phase in which the computer vision system is caused to:
(i) receive a camera point cloud from a camera system;
(ii) receive a first LiDAR point cloud from a first LiDAR system having a first resolution;
(iii) determine a first error of the camera point cloud using the first LiDAR point cloud as a reference;
(iv) determine a first correction function based on the determined first error;
(v) generate a first corrected point cloud from the camera point cloud using the first correction function;
(vi) calculate an output of a point cloud application algorithm using the first corrected point cloud and an output of the point cloud application algorithm using the first LiDAR point cloud;
(vii) determine via a first cost function a first cost of error in the output of the point cloud application algorithm using the first corrected point cloud; and
(viii) update the first correction function based on the determined first cost; and perform a second training phase subsequent to the first training phase in which the computer vision system is caused to:
(a) receive a second LiDAR point cloud from a second LiDAR system having a second resolution, wherein the second resolution of the second LiDAR system is higher than the first resolution of the first LiDAR system;
(b) determine a second error of the first corrected point cloud using the second LiDAR point cloud as a reference;
(c) determine a second correction function based on the determined second error;
(d) generate a second corrected point cloud using the second correction function;
(e) calculate an output of the point cloud application algorithm using the second corrected point cloud and an output of the point cloud application algorithm using the second LiDAR point cloud;
(f) determine via a second cost function a second cost of error in the output of the point cloud application algorithm using the second corrected point cloud; and
(g) update the second correction function based on the determined second cost.

14. The computer vision system of claim 13, wherein the executable instructions, in response to execution by the processor system, cause the computer vision system to repeat operations (v)-(viii) until the first cost is less than a first cost threshold.

15. The computer vision system of claim 13, wherein the executable instructions to determine the first error of the camera point cloud using the first LiDAR point cloud as a reference and to determine the first correction function based on the determined first error, in response to execution by the processor system, cause the computer vision system to:
generate a mathematical representation of the determined first error of the camera point cloud using the first LiDAR point cloud as a reference;
determine the first correction function based on the mathematical representation of the determined first error;
wherein the executable instructions to determine the first error of the first corrected point cloud using the first LiDAR point cloud as a reference and to update the first correction function based on the determined first error, in response to execution by the processor system, cause the computer vision system to:
generate a mathematical representation of the first error of the first corrected point cloud using the first LiDAR point cloud as a reference; and
update the first correction function based on the mathematical representation of the first error.

16. The computer vision system of claim 13, wherein the executable instructions, in response to execution by the processor system, cause the computer vision system to repeat operations (e)-(g) until the second cost is less than a second cost threshold.

17. The computer vision system of claim 13, wherein the second LiDAR system comprises one or more 64-beam LiDAR units and the first LiDAR system comprises one or more 8-beam, 16-beam or 32-beam LiDAR units.

18. The computer vision system of claim 13, wherein the camera system is a stereo camera system and the camera point cloud is a stereo camera point cloud.

19. The computer vision system of claim 13, wherein the processor system comprises a neural network.

20. A computer vision system, comprising:
a processor system;
a sensor system coupled to the processor system;
a memory coupled to the processor system, the memory tangibly storing thereon executable instructions that, in response to execution by the processor system, cause the computer vision system to:
generate a camera point cloud from a camera sensor system;
generate a first corrected point cloud based on the camera point cloud and a pre-trained first correction function, wherein the first corrected point cloud has increased resolution relative to the camera point cloud, wherein the first correction function is based on a first error of the camera point cloud using a first LiDAR point cloud from a first LiDAR system as a reference;
generate a second corrected point cloud based on the first corrected point cloud and a pre-trained second correction function, wherein the second corrected point cloud has increased resolution relative to the first corrected point cloud, wherein the second correction function is based on a second error of the first corrected point cloud using a second LiDAR point cloud from a second LiDAR system as a reference, wherein the second LiDAR system has a second resolution higher than a first resolution of the first LiDAR system;

calculate an output of a point cloud application algorithm using the second corrected point cloud; and output on a display a visual representation of the output of the point cloud application algorithm.

21. The computer vision system of claim 20, wherein the point cloud application algorithm comprises an object detection algorithm, dynamic object removal algorithm, simultaneous localization and mapping (SLAM) algorithm, a point cloud map generation algorithm, a high definition map creation algorithm, a LiDAR-based localization algorithm, a semantic mapping algorithm, tracking algorithm or scene reconstruction algorithm.

22. The computer vision system of claim 20, wherein the camera sensor system is a stereo camera system and the camera point cloud is a stereo camera point cloud.

23. The computer vision system of claim 20, wherein the processor system comprises a neural network.

* * * * *